(12) United States Patent
Regan et al.

(10) Patent No.: US 11,247,765 B2
(45) Date of Patent: Feb. 15, 2022

(54) CARBON NEGATIVE ENERGY GENERATION SYSTEM

(71) Applicant: X Development LLC, Mountain View, CA (US)

(72) Inventors: William Raymond Regan, San Carlos, CA (US); Thomas Peter Hunt, Oakland, CA (US); Thomas Gerard Schuhmann, Jr., Mountain View, CA (US); Benjamin Lundquist Saenz, Berkeley, CA (US); Joel Fraser Atwater, Danville, CA (US); James Daniel Haley, Oakland, CA (US); Kevin Forsythe Smith, Pleasanton, CA (US); Charles Nordstrom, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/085,441

(22) Filed: Oct. 30, 2020

(65) Prior Publication Data

US 2021/0129967 A1 May 6, 2021

Related U.S. Application Data

(60) Provisional application No. 62/928,620, filed on Oct. 31, 2019.

(51) Int. Cl.
*B63H 21/38* (2006.01)
*B63H 21/20* (2006.01)
(Continued)

(52) U.S. Cl.
CPC ............. *B63H 21/38* (2013.01); *B63H 21/08* (2013.01); *B63H 21/20* (2013.01); *F01D 15/10* (2013.01);
(Continued)

(58) Field of Classification Search
CPC ........ B63H 21/38; B63H 21/08; B63H 21/20; F01D 15/10; F01K 15/04; F01K 23/105;
(Continued)

(56) References Cited

U.S. PATENT DOCUMENTS

| | | | |
|---|---|---|---|
| 3,234,580 A * | 2/1966 | Keck | F28G 1/16 15/302 |
| 8,974,756 B2 * | 3/2015 | Martin | B01D 53/83 423/210 |

(Continued)

OTHER PUBLICATIONS

Gagern et al., "Ocean Alkalinity Enhancement: Current state of knowledge and potential role of philanthropy," Sep. 9, 2019 Meeting Proceedings, 50 pages.

*Primary Examiner* — Hoang M Nguyen
(74) *Attorney, Agent, or Firm* — Fish & Richardson P.C.

(57) ABSTRACT

A method for energy generation includes receiving, at a carbon negative energy generation system, input including calcium oxide and water and reacting, within a reaction chamber of the carbon negative energy generation system, the calcium oxide and water to release energy and generate calcium hydroxide. The method further includes directing, by the carbon negative energy generation system, the released energy to facilitate propulsion or onboard electricity generation and dispensing, by the carbon negative energy generation system, the calcium hydroxide into the ocean to sequester atmospheric $CO_2$.

20 Claims, 14 Drawing Sheets

(51) Int. Cl.
*B63H 21/08* (2006.01)
*F01K 15/04* (2006.01)
*F01D 15/10* (2006.01)
*F01K 27/00* (2006.01)
*F01K 23/10* (2006.01)
*B01D 19/00* (2006.01)
*C01F 11/02* (2006.01)

(52) U.S. Cl.
CPC ............ *F01K 15/04* (2013.01); *F01K 23/105* (2013.01); *F01K 27/00* (2013.01); *B01D 19/0005* (2013.01); *C01F 11/02* (2013.01)

(58) Field of Classification Search
CPC ..... F01K 27/00; B01D 19/0005; C01F 11/02; B63B 13/00; B63B 43/06; F02C 6/00
See application file for complete search history.

(56) References Cited

U.S. PATENT DOCUMENTS

| | | | | |
|---|---|---|---|---|
| 2007/0238044 | A1* | 10/2007 | Nakamura | C01F 11/02 430/137.17 |
| 2009/0107111 | A1* | 4/2009 | Oliver | B01D 53/1475 60/274 |
| 2014/0373677 | A1* | 12/2014 | Stumpf | C21B 5/06 75/10.38 |
| 2020/0061527 | A1 | 2/2020 | Gong | |
| 2021/0129078 | A1 | 5/2021 | Regan et al. | |

* cited by examiner

CARBON NEGATIVE ENERGY GENERATION SYSTEM

CROSS-REFERENCE TO RELATED APPLICATIONS

This application claims the benefit of U.S. Provisional Application No. 62/928,620, filed Oct. 31, 2019, the contents of which are incorporated by reference.

FIELD

This specification relates to carbon negative energy generation as applied to propulsion.

BACKGROUND

Carbon dioxide, or $CO_2$, is a common, naturally occurring molecule that is present in the earth's atmosphere and plays an important role in the earth's carbon cycle. All humans and animals exhale carbon dioxide when they breathe, and activities such as deforestation and burning bunker fuels (typically any type of fuel oil used aboard marine vessels, including crude oil, natural gas, diesel, and other hydrocarbons—including alcohols such as methanol) further increase atmospheric $CO_2$. While $CO_2$ is a natural part of Earth's atmosphere and keeps the world at a livable temperature by trapping energy from the sun, elevated levels of $CO_2$ can result in too much heat or energy being trapped in the atmosphere, as well as climatic instability. Additionally, elevated levels of $CO_2$ above a certain threshold can have negative physiological impacts on humans and other life.

SUMMARY

Elevated $CO_2$ levels have significant impacts on the ecosphere such as a rise in temperature or ocean acidity. The marine transportation and cement industries are large producers of carbon pollution. The cement industry also produces calcium oxide at large scales. Calcium oxide mixed with water produces calcium hydroxide and energy. This energy can be used to power a propulsion system or electricity generation system (for ship-board power, etc.). Mixing the calcium hydroxide byproduct into the ocean pulls atmospheric $CO_2$ into the ocean by increasing ocean alkalinity and neutralizing carbonic acid.

Ocean-based carbon dioxide removal is an important option for drawing down atmospheric CO2. However, methods for adding chemicals to the ocean to remove carbon dioxide to the atmosphere can cause changes in ocean chemistry that negatively affect ecosystems. In addition, chemical effects of ocean chemistry modification, such as limestone precipitation, can reduce the amount of carbon dioxide removed by any chemical additives dispersed into the ocean. With controlled distribution, the addition of chemicals to the ocean may positively affect ecosystems, for example, by combatting ocean acidification.

The proposed method can be implemented as an energy generation system onboard a marine vessel. Furthermore, the system can be applied to monitor and modulate ocean chemistry by releasing environmentally beneficial additives into the ocean in a controlled manner. The system can restrict the release of the additives based on a particular geographic region, localized ocean chemistry, and overall ocean chemistry, among other parameters.

Additionally, calcium-containing materials such as calcium oxide and/or calcium hydroxide can be carried aboard ships such as cargo ships. Some cargo ships are "deadheading" ships that are full of cargo in one direction and empty in the opposite direction. This leads to an inefficient use of space. One option to improve the use of space includes carrying calcium-containing material in the empty containers. However, such materials can be corrosive and can erode the containers in which the calcium-containing material is held. By adding a protective bladder made of specialized material that is corrosion-resistant, the empty containers can be loaded with calcium-containing material and the cargo ship can carry and dispense the calcium-containing material along its path of travel.

Systems for implementing the proposed methods can be embodied in various form factors.

In one general aspect, a method for energy generation includes receiving, at a carbon negative energy generation system, input including calcium oxide and water and reacting, within a reaction chamber of the carbon negative energy generation system, the calcium oxide and water to release either energy that directly provides power or in the form of heat and calcium hydroxide. The method further includes directing, by the carbon negative energy generation system, the released heat to facilitate propulsion or onboard electricity generation and dispensing, by the carbon negative energy generation system, the calcium hydroxide into the ocean to sequester atmospheric $CO_2$.

In some implementations, the input includes calcium metal.

In another general aspect, a carbon negative energy generation system includes a boiler that reacts input including calcium oxide and water to release heat and calcium hydroxide and direct the released heat to facilitate propulsion or onboard electricity generation, a thermal management system that heats material streams before the streams are input to the boiler, and a dispersion system that disposes of the calcium hydroxide into the ocean to sequester atmospheric $CO_2$.

In some implementations, the input includes calcium metal.

In another general aspect, a method for energy generation includes receiving, at a carbon negative energy generation system, input including magnesium oxide and water and reacting, within a reaction chamber of the carbon negative energy generation system, the magnesium oxide and water to release heat and magnesium hydroxide. The method further includes directing, by the carbon negative energy generation system, the released heat to facilitate propulsion or onboard electricity generation and dispensing, by the carbon negative energy generation system, the magnesium hydroxide into the ocean to sequester atmospheric $CO_2$.

In some implementations, the input includes magnesium metal.

In another general aspect, a carbon negative energy generation system includes a boiler that reacts input including magnesium oxide and water to release heat and magnesium hydroxide and direct the released heat to facilitate propulsion or onboard electricity generation, a thermal management system that heats material streams before the streams are input to the boiler, and a dispersion system that disposes of the magnesium hydroxide into the ocean to sequester atmospheric $CO_2$.

In some implementations, the input includes magnesium metal.

Throughout the description below, calcium can be used in addition to, or in place of, calcium oxide. Additionally, magnesium and magnesium oxide can be used in place of calcium and calcium oxide. In some implementations, calcium hydroxide, magnesium oxide, magnesium hydroxide, sodium oxide, sodium hydroxide, and other suitable alkali compounds can be used in place of calcium oxide.

This relatively unlimited, cheap method for $CO_2$ capture includes utilizing calcium oxide to power a propulsion system and dispensing the products of the propulsion reaction into the ocean to sequester atmospheric $CO_2$. In some implementations, the products of the reaction can even combat the acidification of the ocean when dispensed into particular ecosystems.

Furthermore, this method can be implemented within an ocean chemistry modification control system that includes a sensing system that detects one or more parameters selected from the group consisting of: a geographical parameter defining an area in ocean water, an ocean chemistry parameter, and a material parameter. The system includes a material dispensing system for installation on a ship that releases material from the ship into ocean water. In some implementations, the system includes a material dispensing system comprising one or more independently controlled modules that each release material into ocean water. The system also includes a controller that controls the material dispensing system according to a target chemical concentration. The controller controls the material dispensing system by modelling, based on the one or more parameters, a particular aspect of ocean chemistry, determining, based on the one or more parameters, the modelled particular aspect of ocean chemistry, and the target chemical concentration, a first amount of material and a first rate at which the material is to be released from the ship into ocean water, and generating a control instruction for the material dispensing system to release the first amount of the material at the first rate into ocean water.

In some implementations, generating a control instruction for the material dispensing system can include generating, for each of the one or more independently controlled modules, a control instruction.

The proposed invention also provides a novel system for monitoring and modulating ocean chemistry by releasing alkali compounds into the ocean in a controlled manner. The system provides local and relatively immediate protection for a vulnerable population or ecosystem. The system can restrict the release of the compounds based on a particular geographic region, localized ocean chemistry, and overall ocean chemistry, among other parameters.

Machine learning models or finite element models can be applied to the proposed methods to model and predict ocean flow, mixing, chemical dispersion, and plume patterns, among other processes and determine mixing and output instructions to optimize for parameters such as ocean chemistry, environmental factors, ship status, etc. For example, the proposed system can automatically determine an optimal concentration of seawater to chemicals needed to produce a desired ocean chemistry concentration in the wake of the ship. The proposed system can automatically determine an optimal direction and time at which to release an optimal amount of slaked lime into the ocean to maintain a particular concentration of lime in the particular area of the ocean.

The system can be implemented as a controller integrated with ship subsystems and networks, including existing monitoring and sensing systems, ballasting systems, storage tanks, and power systems, among other systems. The controller can perform data modeling and generate control instructions locally. In some implementations, the controller can be implemented as a distributed computing system.

The proposed bladder solution for storing calcium-containing material allows ships to quickly be loaded with calcium-containing material, bypassing the need to swap containers already onboard a ship for containers that are treated to handle the calcium-containing material. The bladder system also allows ships to store dry calcium-containing material onboard, increasing the capacity of the ship to hold the material to be released as compared to the ship's capacity to hold diluted mixtures of the calcium-containing material. The bladder solution allows a ship to carry calcium-containing materials with minimal retrofitting. Furthermore, the order in which the cargo containers are filled with calcium-containing material and/or mixed with seawater can be used to control ship ballasting and maintain ship stability. In some implementations, the active container system can circumvent the ship's existing ballasting system, including the tanks, pumps, and pipes, removing the risk of accelerated corrosion damage to the ship.

This active, modular container system includes multiple interconnected containers that form a smart container system. This system can generate energy to run auxiliary systems, provide the proper mixture of chemicals to seawater to produce a particular chemical concentration, and draw seawater in from the outside, among other functions. This system can be integrated with existing systems, and includes a controller that controls components associated with each of the containers in the system.

Machine learning models can be applied to the proposed methods to select and modify concentrations needed from the system. For example, the proposed system can automatically determine an optimal amount of water to pull from the ocean to mix into the container system and produce a particular chemical concentration.

The system can be implemented as a system that is integrated in a ship with one or more existing systems. The system can be modular and includes flexible bladders that can be retrofitted to existing shipping containers as well as a mixing system for calcium-containing material that is loaded into the bladders of the containers.

In one aspect of the invention, an active, modular containerized system for a ship includes two or more shipping standard compliant containers connected by piping, where a first container is for connection to the outside of the ship and a second container contains calcium oxide, each of the two or more containers having a protective bladder lining manufactured according to a target protection parameter based on the calcium oxide. The system includes a mixing system that is connected to each of the two or more containers by piping. The system includes a controller that controls the mixing system by providing control signals to the mixing system to control the mixing of calcium oxide and ocean water by controlling the connection of the first container when connected to the outside of the ship and by controlling the connection between the second container and the first container.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
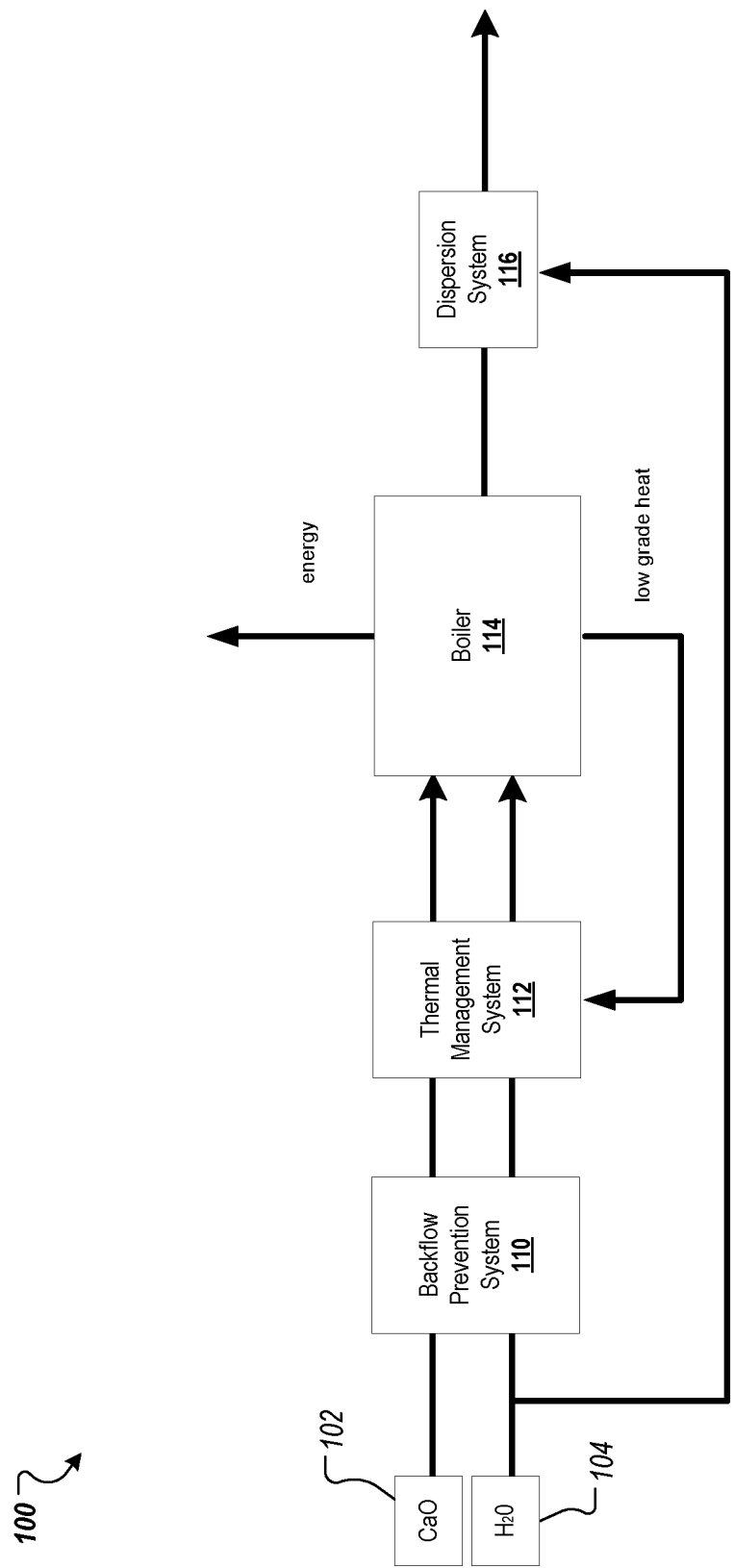
FIG. 1 is a diagram of an example configuration of carbon negative energy generation system.

Reducing elevated levels of $CO_2$ has become an increasingly important area of study. In addition to having significant impacts on the ecosphere, levels of $CO_2$ beyond a certain threshold have negative physiological impacts on humans. A carbon negative method of propulsion that utilizes source materials and byproducts of the cement and marine shipping industry is described herein.

Marine shipping is a significant emitter of greenhouse gases due to the prevalence of bunker fuel (which produces massive amounts of $CO_2$ when burned) in powering ship engines. The cement industry is also a big emitter with direct (chemical reactions to produce source materials) and indirect (fossil fuel used for heating systems) emissions. Together, these industries account for almost 10% of the world's greenhouse gas emissions.

The primary ingredient of cement is calcium oxide (CaO). Calcium oxide is produced from calcining calcium carbonate ($CaCO_3$). For example, calcium carbonate can be placed in a kiln and calcined to produce calcium oxide. This process also generates pure or highly concentrated $CO_2$, which can be separated and/or sequestered or placed in long-term storage by injecting it into the ground below, for example, cap rock.

The calcium oxide used in cement can also be used for fuel in propulsion systems. For example, marine vessels in the shipping industry can be powered by the proposed system, which uses calcium oxide reactions to release energy. In this example, the product of the calcium oxide reaction, calcium hydroxide ($Ca(OH)_2$) can be dispensed into the ocean, where it pulls down and sequesters atmospheric $CO_2$, producing a net negative carbon impact. By propelling marine vessels with a carbon negative energy generation method, a large $CO_2$ source can be turned into a $CO_2$ sink.

Calcium and calcium oxide have lower energy densities than cheaper, readily available bunker fuels, but have higher energy density than other energy storage solutions, such as batteries. Additionally, limestone is plentiful, and this method of dispensing can combat acidification of ocean water in some areas (such as coasts and reefs), as calcium oxide and calcium hydroxide are highly basic. The pH of immediate areas of the ocean can quickly equilibrate (due to wake growth, mixing, and currents) at less than 9. Additionally, if sufficiently diluted, calcium hydroxide is not known to have negative biological effects, such as seeding blooms, as some alternative compounds (e.g., ground silicate minerals, especially those that contain iron).

Using cement materials to power marine vessels with a carbon negative energy generation method co-benefits these large industries and provides an avenue for cleaner shipping and cement industries.

The proposed method can be implemented as a system that reacts calcium oxide with water (including seawater), directs the energy released from the reaction to facilitate propulsion, and dispenses the product of the reaction to sequester $CO_2$.

The system can include, for example, a boiler reaction chamber that powers a heat engine, a direct thrust engine, a combustion engine that uses hybrid fuel, and a series of engines.

The system includes several subsystems that maintain the system. For example, the system can include a backflow prevention subsystem that keeps water from washing back into the calcium oxide and reacting, a wash cycle that cleans the engine with water to rinse and dilute the contents, which may be harmful to skin, and slows corrosion, and a battery hybrid system for use in port.

The proposed method provides a simple system that reduces the amount of carbon dioxide in the atmosphere while generating energy aboard the ship for propulsion or auxiliary uses.

A significant portion of current $CO_2$ emissions in the atmosphere are absorbed by the oceans. Ocean water contains negatively charged bicarbonate ions, which are balanced with positive ions such as calcium and magnesium. A build-up of such positive ions through increasing ocean alkalinity can effect an uptake of $CO_2$ in ocean water, known as carbon sequestration, that can mitigate the elevated levels of $CO_2$ in the atmosphere. Ocean alkalinity enhancement (OAE) is a promising pathway for carbon dioxide removal because it mimics naturally occurring phenomena that reduce both ocean acidification and atmospheric $CO_2$ levels.

The proposed system also allows for ocean chemistry modification, for example, through increased alkalinity by adding crushed magnesium or calcium bearing rocks or calcium or magnesium hydroxide into the ocean. When $CO_2$-reactive forms of alkalinity are added, they react rapidly with seawater $CO_2$ to form non-$CO_2$-reactive bicarbonates, consuming acidity and elevating pH, in addition to increasing $CO_2$ adsorption of the ocean.

Furthermore, the proposed system allows for more efficient use of space aboard cargo ships and other marine vessels that currently travel with unused cargo holds. This active, modular container system also allows an existing ship to be fitted to carry calcium-containing materials used for ocean chemistry modification, for example, through increased alkalinity by adding crushed magnesium or calcium bearing rocks or calcium or magnesium hydroxide into the ocean. When CO2-reactive forms of alkalinity are added, they react rapidly with seawater CO2 to form non-CO2-reactive bicarbonates, consuming acidity and elevating pH, in addition to increasing CO2 adsorption of the ocean. The system increases a ship's capacity for carrying such calcium-containing materials by allowing ships to store calcium-containing materials in a dry form as opposed to a pre-mixed and diluted slurry.

Because the system is modular, allowing for components to be added to existing ships and integrated with existing systems while providing the same or a similar level of functionality. The system can control a container system onboard a ship having a single container just as it can control a container system onboard a ship having multiple containers. The system can be integrated with different power systems, piping systems, ballast systems, and other systems of a ship.

FIG. 1 is a diagram of an example configuration of a carbon negative energy generation system 100. System 100 provides propulsion through energy produced from reactions between calcium oxide and water. The reaction product, calcium hydroxide, is dispensed to sequester $CO_2$, reducing atmospheric concentrations of carbon. System 100 can be used, for example, to power a marine shipping vessel.

System 100 is shown to include a backflow prevention system 110, a thermal management system 112, boiler 114, and a dispersion system 116. System 100 receives inputs 102 of Ca (calcium), CaO (calcium oxide), Mg (magnesium), or MgO (magnesium oxide) and $H_2O$ 104 (water or steam). For simplicity, this specification describes all embodiments and examples with respect to calcium oxide, but calcium metal, magnesium, and magnesium oxide can be used in all instances in which calcium oxide is used. It is further understood that embodiments using calcium and magnesium may require different forms of production, such as electrolytic reduction. In this particular example, system 100 is implemented within a marine shipping vessel.

Calcium oxide 102 can be obtained from sources such as cement or quicklime production plants. In some implementations, magnesium oxide can be used in place of calcium oxide. Calcium oxide 102 is stored in its solid state and can be stored in, for example, powder or chunk form. Calcium oxide 102 can be stored, for example, in a tank or other storage container. In some implementations in which bunker fuel and the proposed carbon negative propulsion system are used, calcium oxide 102 can be stored within the bunker fuel to prevent unwanted reactions. For example, powdered calcium oxide or magnesium oxide may produce an exothermic reaction when exposed to oxygen or water, but storing calcium oxide 102 within a tank of bunker fuel such as kerosene will passivate the material and prevent undesired reactions. In other implementations in which bunker fuel and the proposed system are used, calcium oxide 102 can be stored separate from the bunker fuel.

Water 104 can be obtained from, for example, the ocean. The marine shipping vessel within which system 100 is implemented can pump ocean water into system 100. By sourcing one of the reactants of the propulsion system from its current location, the marine shipping vessel can reduce or eliminate fuel weight and allocate more weight to cargo. In some implementations, water 104 can be obtained from the ocean through a high pressure outlet. In some implementations, water 104 can be pumped into system 100. In some implementations, water 104 can be stored in a tank or other storage container within the marine shipping vessel.

Backflow prevention system 110 prevents the backflow of water 104 into calcium oxide 102. Because the reaction of calcium oxide 102 and water 104 is the source of energy for system 100, backflow prevention system 110 prevents wasted energy from unnecessary reactions. Additionally, backflow prevention system 110 acts as a safety measure against unexpected reactions occurring within a portion of system 100 that is not, for example, pressurized or designed to withstand the heat of the reaction between calcium oxide 102 and water 104.

Thermal management system 112 heats calcium oxide 102 and water 104 prior to the mixing of the material streams. Each of the material streams is then provided to boiler 114. In some implementations, thermal management system 112 manages heat within system 100 in addition to providing heat to the calcium oxide and the water (in some implementations, turning the water to steam) prior to mixing within boiler 114. For example, thermal management system 112 can manage process heat from connected systems such as a steam engine or combustion engine. Thermal management system 112 can manage low-grade excess heat from boiler 114 that is not used as energy directed to, for example, a heat engine or as direct thrust propulsion.

Boiler 114 is a reaction chamber in which the calcium oxide-water reaction is carried out. Boiler 114 mixes the material streams to initiate the reaction and contains and directs the energy (i.e., heat) from the reaction. Boiler 114 can direct the energy to, for example, a separate heat engine or through a chamber shaped to focus the steam power to create a high-pressure water jet that provides direct thrust propulsion force. Boiler 114 is connected to dispersion system 116 and can release products of the reaction to dispersion system 116 for disposal.

In some implementations, system 100 is used as a primary fuel and the reaction between calcium oxide 102 and water 104 is used directly to produce electricity. For example, system 100 can be implemented as an electrochemical system similar to a flow-battery: an alkaline fuel cell, or a primary flow battery in which Ca ions move across an electrolyte produces electricity, and the resulting calcium hydroxide is released to dispersion system 116. System 100 can be used to fully power propulsion systems or auxiliary systems of the marine vessel.

Dispersion system 116 can be, for example, a dispersion system that disperses the product or products of system 100, such as the calcium hydroxide. Dispersion system 116 can dispose of the byproduct of system 100 directly to the environment. For example, dispersion system 116 can directly deposit calcium hydroxide, a product of the reaction between calcium oxide 102 and water 104, into the ocean. The calcium hydroxide increases the ocean's ability to buffer inorganic carbon via atmospheric $CO_2$ uptake. In some implementations, dispersion system 116 dilutes the product before releasing them. For example, dispersion system 116 can draw water 102 (from the ocean or from a storage container within the marine vessel) into its dilution system to reduce the concentration of the product prior to dispensing the product into the ocean.

Figure 2:
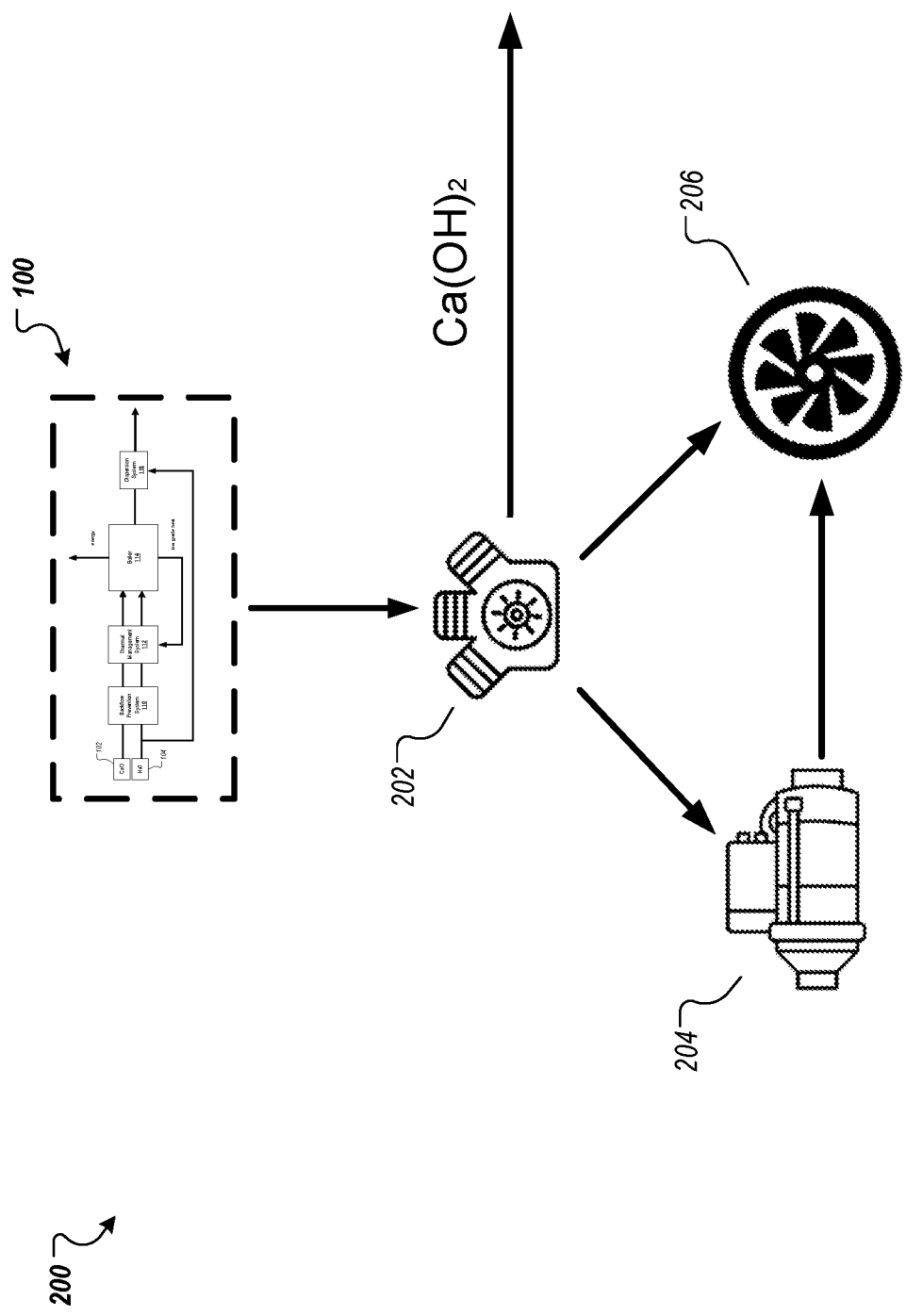
FIGS. 2-5 are diagrams of example applications of the carbon negative energy generation system.

FIG. 2 is a diagram of an example application of the carbon negative energy generation system to a system 200 having a steam engine or turbine and a heat recovery mechanism.

System 200 includes system 100 as described above with respect to FIG. 1, a steam engine or turbine 202, an electrical generator 204, and a hybrid electric/direct drive system 206.

As described above with respect to FIG. 1, system 100 reacts calcium oxide 102 and water 104 to release heat and generate calcium hydroxide. System 200 directs this energy to steam engine or turbine 202. As described above with respect to FIG. 1, system 100 dispenses the product of the reaction between calcium oxide 102 and water 104 into the ocean to provide benefits such as pH balance and carbon sequestration.

Steam engine or turbine 202 is a heat engine that performs mechanical work using steam as its working fluid. Steam engine or turbine 202 uses the force produced by steam pressure to push a piston back and forth (in the case of steam engine 202) or to turn the blades of a turbine (in the case of steam turbine 202).

The process heat from steam engine or turbine 202 can be directed to system 100. For example, the process heat from steam engine or turbine 202 can be directed to thermal management system 112 to preheat the material streams 102, 104 prior to being reacted in boiler 114.

Electrical generator 204 is driven by steam engine or turbine 202. Electrical generator 204 converts mechanical energy from steam engine or turbine 202 into electrical power. In some implementations, electrical generator 204 can include an electrochemical energy storage system, such as a battery. For example, electrical generator 204 can store electrical power within a battery for release upon demand.

Hybrid electric/direct drive system 206 is driven by steam engine or turbine 202 and—through a combination of electric and direct force drive motors—provides thrust propulsion force.

System 200 is a carbon negative system powering a steam engine/turbine with a heat recovery system.

Figure 3:
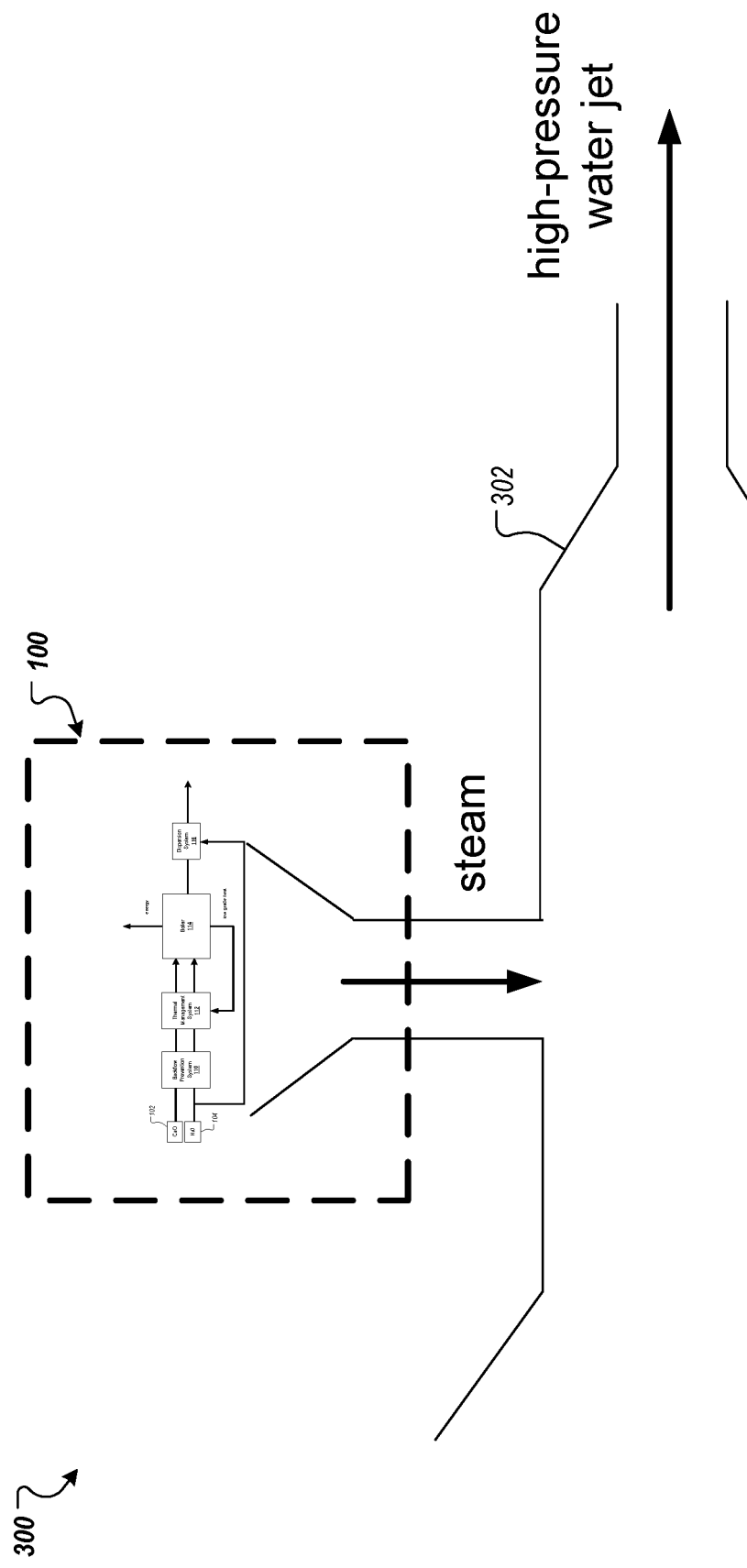

FIG. 3 is a diagram of an example application of the carbon negative energy generation system to system 300 including a direct thrust engine.

System 300 includes system 100 as described above with respect to FIG. 1 and a directional thrust chamber 302. Boiler 114 of system 100 is integrated with directional thrust chamber 302 such that boiler 114 serves as the reaction chamber of system 300. Boiler 114 can inject calcium oxide into its reaction chamber to create high pressure steam. For example, boiler 114's reaction chamber may already contain water or steam, and the injection of calcium oxide 102 can create steam that forces the steam into directional thrust chamber 302. In some implementations, boiler 114 can be a chamber having a high pressure water outlet that can be opened and into which calcium oxide 102 can be injected to create high pressure steam.

Directional thrust chamber 302 is shaped to direct the high pressure steam from system 100 into forming a high pressure water jet that provides direct thrust propulsion force.

Figure 4:
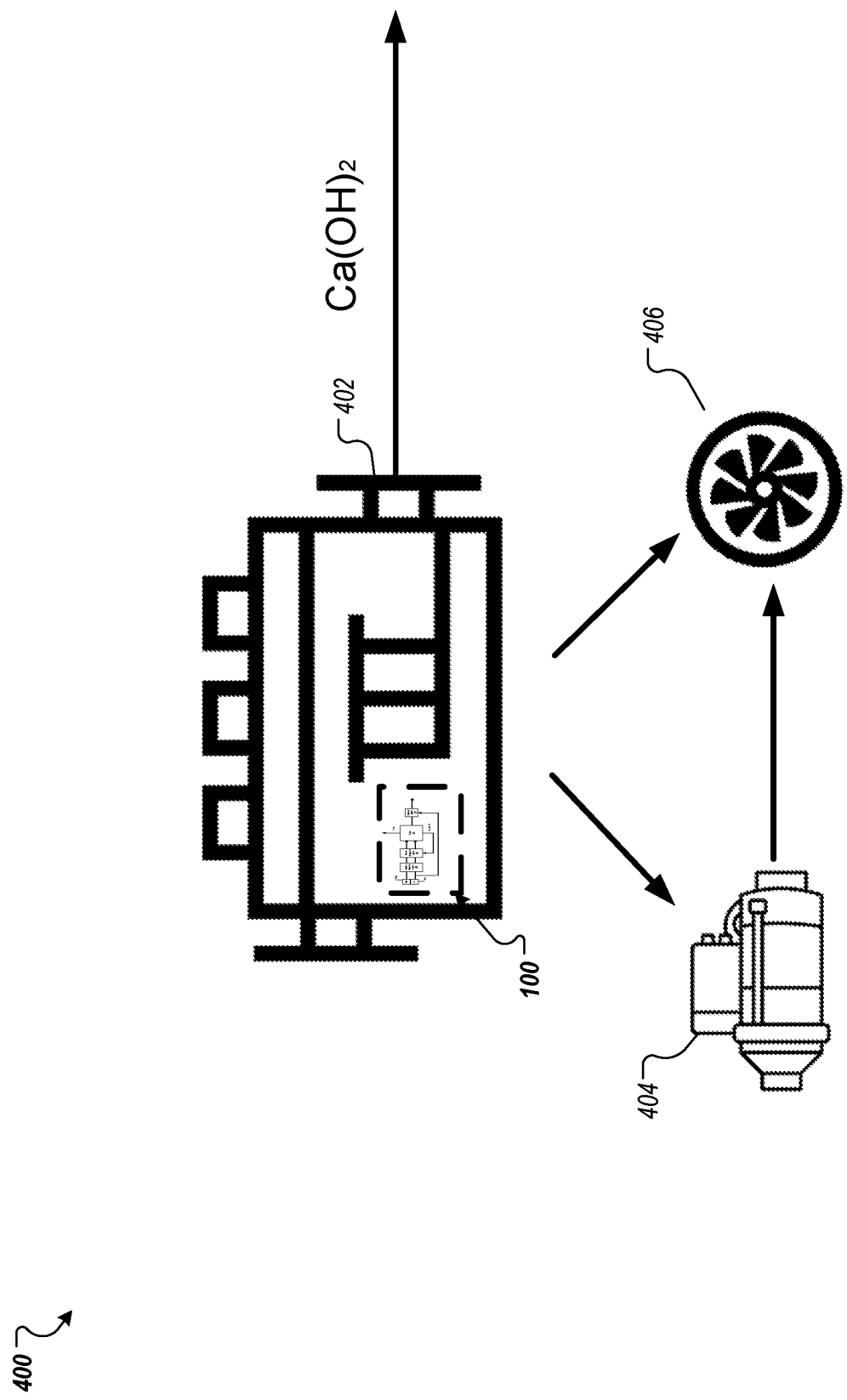

FIG. 4 is a diagram of an example application of the carbon negative energy generation system to system 400 that includes a hybrid combustion engine.

System 400 includes system 100 as described above with respect to FIG. 1 integrated into a hybrid combustion engine 402, electrical generator 404, and hybrid electric/direct drive system 406.

Electrical generator 404 is an electrical generator similar to electrical generator 204 as described above with respect to FIG. 2. Hybrid electric/direct drive system 406 is a motor system similar to hybrid electric/direct drive system 206 as described with respect to FIG. 2.

Hybrid combustion engine 402 uses traditional bunker fuel that is mixed with calcium oxide to release heat. As described above with respect to FIG. 1, calcium oxide can be stored in the same storage container as traditional bunker fuel. This mixture of bunker fuel and calcium oxide can be injected into hybrid combustion engine 402. Hybrid combustion engine 402 burns traditional bunker fuel and can utilize the exhaust water or steam from bunker fuel combustion as water 104 to react with calcium oxide 102 as described above with respect to FIG. 1. In some implementations in which supplemental water 104 is needed as input to boiler 114 to react with calcium oxide 102, seawater 104 is pumped into hybrid combustion engine 402.

Figure 5:
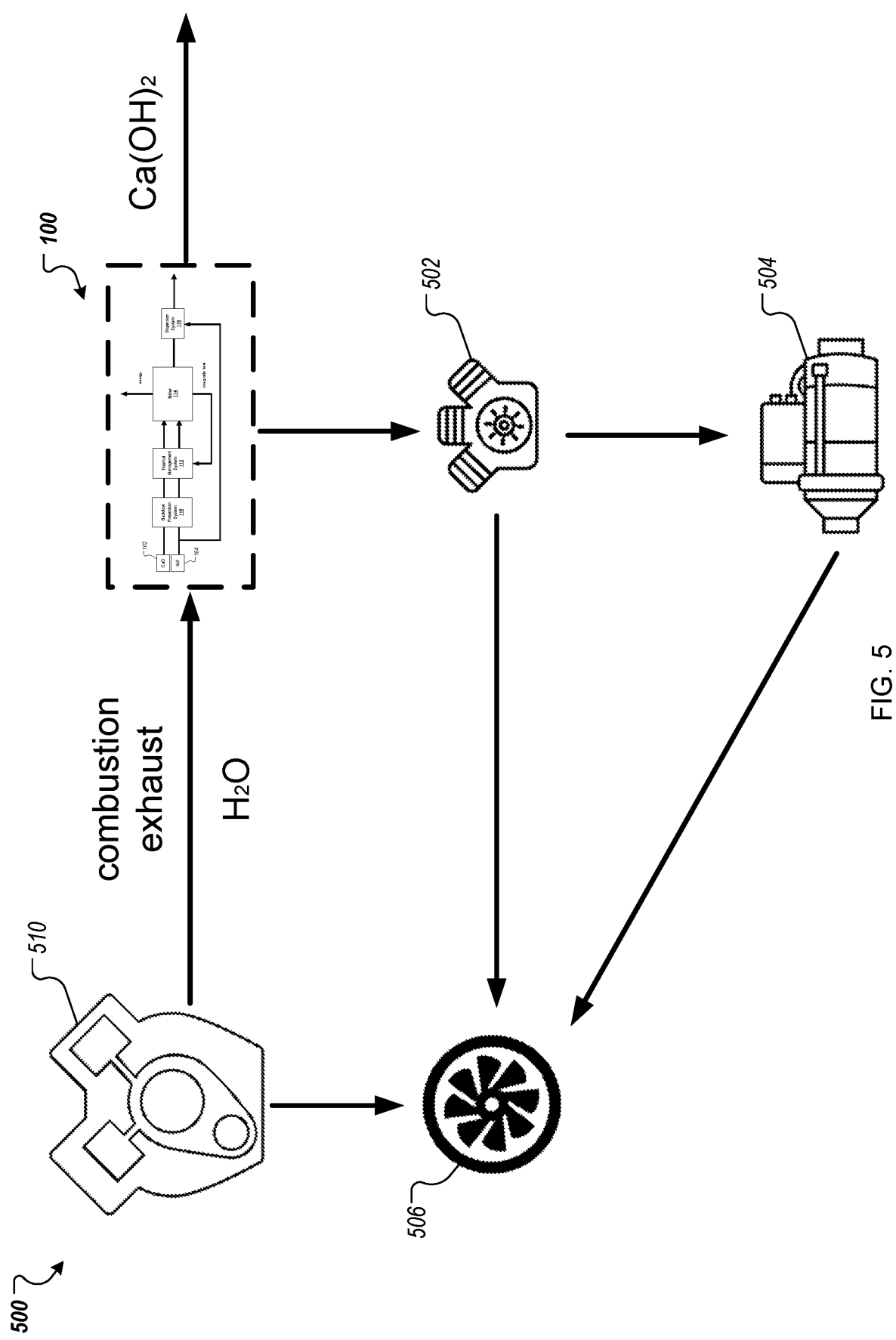

FIG. 5 is a diagram of an example application of the carbon negative energy generation system to a serial system 500 including a combustion engine and a steam engine or turbine.

System 500 includes a traditional combustion engine 502, system 100 as described above with respect to FIG. 1 connected to traditional combustion engine 510, steam turbine 502, electrical generator 504, and hybrid electric/direct drive system 506.

Steam turbine 502 is a steam turbine similar to steam engine or turbine 202 as described above with respect to FIG. 2. Electrical generator 504 is an electrical generator similar to electrical generator 204 as described above with respect to FIG. 2. Hybrid electric/direct drive system 506 is a motor system similar to hybrid electric/direct drive system 206 as described with respect to FIG. 2.

Traditional combustion engine 510 is a combustion engine that generates mechanical energy by combustion of a fuel. Traditional combustion engine 510 can, for example, combust bunker fuel.

Traditional combustion engine 510 outputs mechanical energy to hybrid electric/direct drive system 506 to produce propulsion forces.

Exhaust water from traditional combustion engine 510 is directed to system 100 to be used as water 104. In some implementations, traditional combustion engine 510 also exhausts low-grade heat, which can be input to thermal management system 112 to preheat material streams such as calcium oxide 102 and water 104. This serial system of traditional combustion engine 510 and system 100 reduces the amount of bunker fuel needed to power the marine shipping vessel and provides the pH balancing and $CO_2$ sequestration benefits of system 100.

Figure 6:
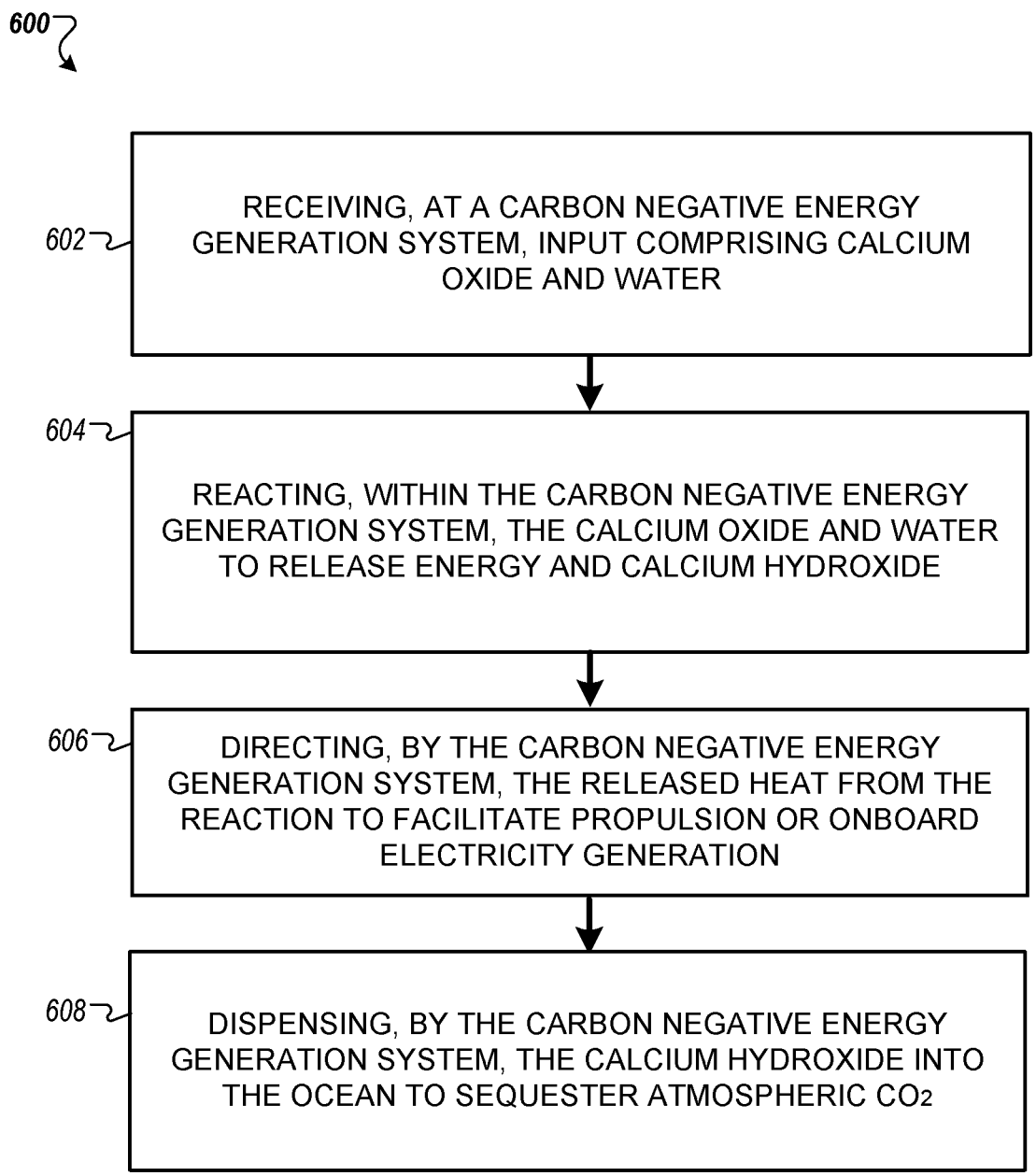
FIG. 6 is a flow chart of an example process of carbon negative energy generation.

FIG. 6 is a flowchart of an example process 600 of carbon negative energy generation. Process 600 can be implemented by carbon negative energy generation systems such as systems 100, 200, 300, 400, and 500 as described above with respect to FIGS. 1-5. In this particular example, process 600 is described with respect to system 100. Briefly, according to an example, the process 600 begins with step 602 by receiving, at a carbon negative energy generation system, input of calcium oxide and water. For example, system 100 can receive material streams of calcium oxide 102 and water 104.

The process 600 continues with step 604 by reacting, within the carbon negative energy generation system, the calcium oxide and water to generate energy and calcium hydroxide. For example, boiler 114 can initiate the mixing of calcium oxide 102 and water 104. In some implementations, boiler 114 can inject calcium oxide 102 into water within its reaction chamber. In some implementations, boiler 114 can include a high pressure water outlet within its reaction chamber and water 104 can be let into the chamber, which is filled with calcium oxide 102.

The process 600 continues with step 606 by directing, by the carbon negative energy generation system, energy from the reaction to facilitate propulsion. For example, boiler 114 can direct the heat energy from the reaction of calcium oxide 102 and water 104 to steam engine or turbine 202, directional thrust chamber 302, internally within hybrid combustion engine 402, or steam turbine 502.

The process 600 concludes with step 608 by dispensing, by the carbon negative energy generation system, the calcium hydroxide product of the reaction to sequester $CO_2$. For example, dispensing system 116 can dispose of the calcium hydroxide into the ocean to balance ocean pH levels and draw down and stabilize atmospheric $CO_2$.

Figure 7A:
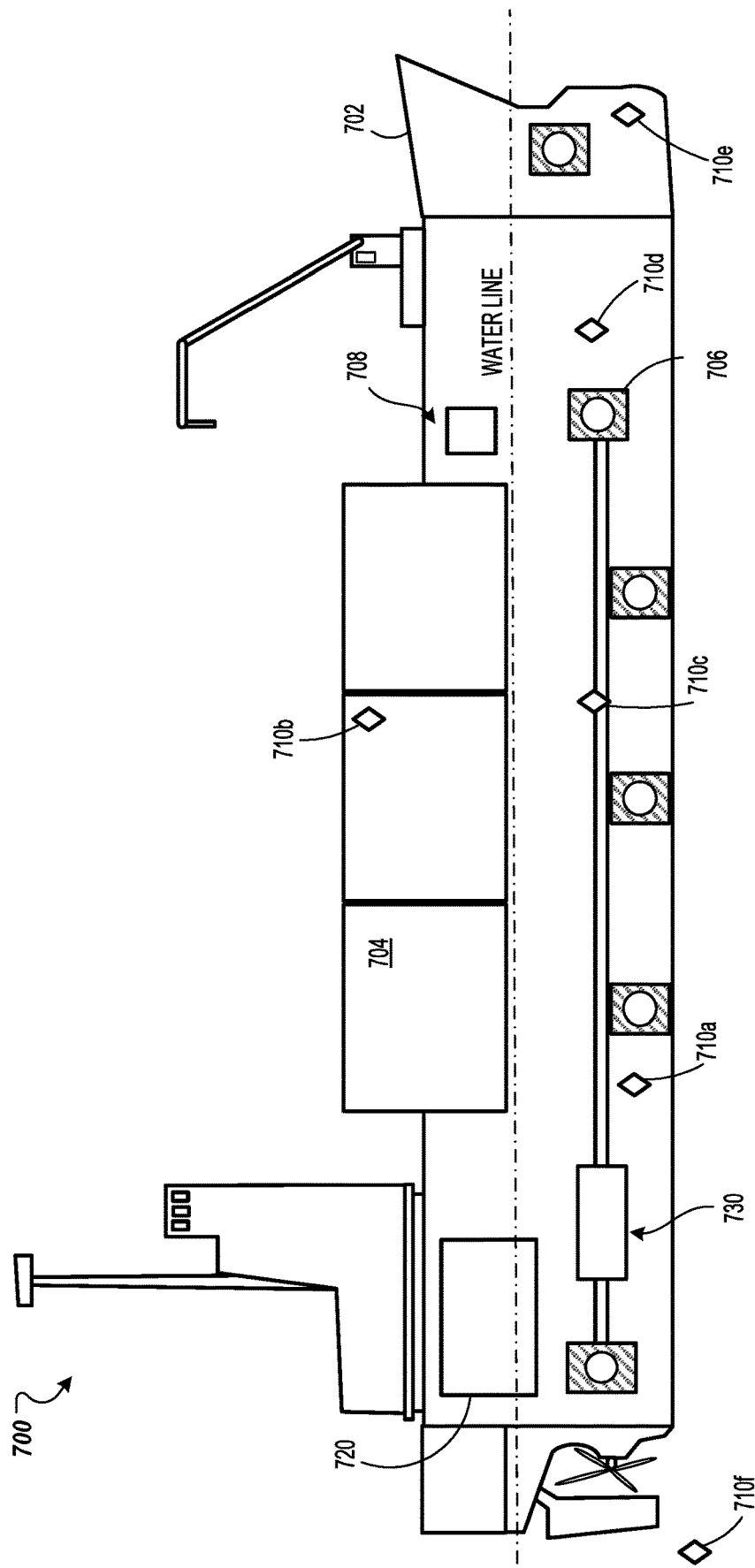
FIGS. 7A and 7B are diagrams of example configurations of a control system for ocean chemistry modification.

FIG. 7A is a diagram of an example configuration of control system for ocean chemistry modification 700. System 700 determines appropriate levels of chemicals to be dispensed into the ocean and controls the dispensation of such chemicals according to a target level of chemical concentration and other parameters to sequester $CO_2$, reducing atmospheric concentrations of carbon. System 700 includes a marine vessel 702, cargo 704, sensing system 708, control system 720, and material dispensing system 730.

Marine vessel 702 is a marine vessel, such as a ship, that travels in the ocean. Marine vessel 702 can be any of various types of ships. In this particular example, marine vessel is a cargo ship that transports cargo containers 704 across the ocean. Cargo containers 704 can range from full to empty and can be filled with cargo for transport, materials to be dispensed into the ocean, and water for mixing with the materials to be dispensed, among other substances.

Marine vessel 702 is a ship on which the energy generation systems and methods of FIGS. 1-6 can be implemented. For example, the carbon negative energy generation systems and the applications in which they are integrated as described with respect to FIGS. 1-5 can be implemented as the propulsion system for marine vessel 702 and integrated with material dispensing system 730. In some implementations, cargo 704 being carried by marine vessel 702 can include the calcium oxide 102 or other inputs (such as Ca, Mg, or MgO). In some implementations, thermal management system 112 can be implemented as part of control system 720. In some implementations, dispersion system 116 can be implemented as part of material dispensing system 730.

Marine vessel 702 is shown to include hatches or ports 706 to the outside of the marine vessel 702. These ports 706 allow for the expulsion of substances from within marine vessel 702 into the ocean and for the intake of substances from outside the marine vessel 702 into the marine vessel 702. The ports can be located at any point along marine vessel 702, such as the bow, along the hull, and the stern.

Marine vessel 702 can include a supply of materials to be dispersed into the ocean. For example, marine vessel 702 can house a supply of calcium-containing materials such as Ca or CaO or magnesium-containing materials such as Mg or MgO that can be released into seawater to increase seawater alkalinity. Calcium and/or calcium oxide can be stored in its solid state, for example, in powder or chunk form. Calcium and/or calcium oxide can be stored, for example, in a tank or other storage container. In some implementations, magnesium and/or magnesium oxide can be used in place of calcium and/or calcium oxide. In some implementations, the calcium-containing material can include $Ca(OH)_2$ or calcium hydroxide and the magnesium-containing materials include $Mg(OH)_2$ or magnesium oxide.

In order to achieve a particular concentration of chemical mixture to be released into the ocean, system 700 can mix the calcium-containing materials with water. Water can be obtained from, for example, the ocean. Marine vessel 702 can pump ocean water into system 700. By sourcing one of the reactants of the propulsion system from its current location, marine vessel 702 can reduce or eliminate fuel weight and allocate more weight to cargo. In some implementations, water can be obtained from the ocean through a high pressure outlet. In some implementations, water can be pumped into system 700. In some implementations, water can be stored in a tank or other storage container within marine vessel 702.

In some implementations, marine vessel 702 can include a backflow prevention system that prevents the backflow of water into the material to be dispersed. Because the reaction of materials such as calcium oxide and water is a source of energy, a backflow prevention system prevents wasted energy from unnecessary reactions. Additionally, a backflow prevention system acts as a safety measure against unexpected reactions occurring within a portion of system 700 that is not, for example, pressurized or designed to withstand the heat of reactions between water and materials such as calcium oxide.

Sensing system 708 is configured to monitor water, ship, and weather parameters, among other measurable parameters.

Sensing system 708 includes sensors 710*a*, 710*b*, 710*c*, 710*d*, 710*e*, and 710*f* (collectively referred to as sensors 710). Each of sensors 710 can be a single sensor of a particular type or an array of sensors. Sensors 710 can be placed in various positions along and around marine vessel 702. For example, sensor 710*f* can be a trailing array of sensors that travels behind marine vessel 702 in its wake. Sensors 710 can be placed along the hull of marine vessel 702 on the outside, by the propeller of marine vessel 702, and inside of various cargo containers 704 aboard marine vessel 702, among other locations.

Sensors 710 detect, for example, water parameters, ship parameters, and weather parameters. Water parameters include current data, water temperatures, saturation levels of various chemicals, and O2 levels, among other parameters associated with the water in which marine vessel 702 is located. Ship parameters include absolute velocity and water velocity of marine vessel 702, engine state, direction of travel, and propeller speed, among other parameters associated with marine vessel 702 itself. Weather parameters include wind speed and direction, wave data, tide data, solar radiation data, circulation patterns, cloud cover, and the weather forecast, among other parameters associated with the weather and environmental conditions. Sensors 710 can also detect environmental factors such as seafloor topography and perform remote sensing of target areas. For example, sensors 710 can monitor the pH levels of a target area such as a coral reef to protect the particular chemical concentration levels required in that area. Data from sensing system 708 can be analyzed to generate data such as mass spectrometry.

Detection can be done using electrical, optical, and/or magnetic techniques by sensors such as accelerometers, gyroscopes, magnetometers, inertial measurement units (IMUs), GPS, electromyography (EMG), mechanomyography (MMG), visual sensors, depth sensors, and/or encoders, among other types of detection techniques. Sensors 710 can include velocity sensors, temperature sensors, infrared sensors, sonar sensors, pH sensors, and bio parameter sensors, among other types of sensors.

In one example, sensor 710*f* is an array of sensors trailing marine vessel 702 that measures the ocean chemistry of the water in the wake of marine vessel 702. This trailing water chemistry data can be used, for example, as feedback to system 700 to adjust the control instructions provided to material dispensing system 730.

In some implementations, sensors 710 can include sensors that monitor environmental parameters such as approaching macrofauna such as whales, dolphins, and fish, among other forms of aquatic life. For example, sensors 710 can include a sonar array that provides data to system 700, where system 700 implements an immediate response to detection of an approaching whale. This response can include control instructions to alter the operation of material dispensing system 730 in addition to systems such as the navigation and propulsion systems of marine vessel 702.

Control system 720 includes one or more computer processors that control the operation of various components of system 700, including sensing system 708 and material dispensing system 730 and components external to system 700, including systems that are integrated with or communicably connected to system 700, such as satellites, remote computing devices, and other marine vessels, among other systems.

Control system 720 generates control signals for system 700 locally. The one or more computer processors of control system 720 continually and automatically determine control signals for the system 700 without communicating with a remote processing system. For example, control system 720 can receive ocean chemistry feedback data from sensors 710 in response to actions taken by material dispensing system 730 and process the data to determine and generate control signals for material dispensing system 730 to alter or maintain a target level of ocean chemistry or an area into which material is dispensed.

Control system 720 uses models including machine learning models and/or finite element models to predict ocean flow, mixing, chemical dispersion, and plume patterns, among other processes. Control system 720 is configured to determine mixing and output instructions for material dispersion system 130 according to target parameters such as ocean chemistry levels. For example, control system 720 can automatically determine an optimal concentration of seawater to chemicals needed to produce a desired ocean chemistry concentration in the wake of marine vessel 702.

Control system 720 controls sensors 710 to collect and/or record data associated with the movement of marine vessel 702, ocean chemistry, weather, and water conditions surrounding marine vessel 702, among other measurable parameters. For example, sensors 710 can collect and/or record data associated with upwelling in a particular geographic area. Sensors 710 can also measure movement and activity through optical, electrical, and magnetic techniques, among other detection techniques.

Control system 720 is communicatively connected to sensing system 708 and material dispensing system 730. In some implementations, control system 720 is connected to sensing system 708 and material dispensing system 730 through communications buses with sealed conduits that protect against solid particles and liquid ingress. In some implementations, control system 720 transmits control signals to components of system 700 wirelessly through various wireless communications methods, such as RF, sonic transmission, electromagnetic induction, etc.

Control system 720 can receive feedback from sensing system 708. Control system 720 can use the feedback from sensing system 708 to adjust subsequent control signals to system 700.

Control system 720 can be communicatively connected to sensors other than sensors 710, such as sensors external to the system 700, and can use the data collected by sensors external to the system 700 in addition to the data collected by sensors 710 to generate control signals for the system 700. For example, control system 720 can be communicatively connected to external weather monitoring systems, observation satellites, or GPS satellites that are external to the system 700. Control system 720 can also receive sets of data such as surveys of migration patterns of aquatic life and real-time data such as data collected by networks of buoys.

Control system 720 uses the sensor data to generate control signals for material dispensing system 730. For example, control system 720 can determine that a particular area is protected and use GPS to enforce geofencing technology, preventing the release and/or propagation of materials into the particular area. Control system 720 can, for example, receive a predetermined set of protected areas. Control system 720 can detect that a particular area should be protected or restricted. For example, if control system 720 determines, based on data from sensing system 708, that there is a port, control system 720 can automatically designate an area as protected or restricted.

Material dispensing system 730 is configured to dispense substances from marine vessel 702 into the surrounding water. Material dispensing system 730 is configured for integration with marine vessel 702. Material dispensing system 730 includes various subsystems configured for the mixing and expelling of substances from marine vessel 702. Subsystems of material dispensing system 730 can be placed in various positions along marine vessel 702.

Material dispensing system 730 can include, for example, a mixing subsystem that can mix precise proportions of water and calcium in powder form onboard marine vessel 702. The mixing subsystem can mix substances from different sources. For example, material dispensing system 730's mixing subsystem can mix seawater drawn into marine vessel 702 through ports 706 with calcium oxide stored onboard marine vessel 702. The mixing subsystem includes components configured to perform mixing and pumping, among other actions. Material dispensing system 730's mixing subsystem can dispense a calculated portion of substances directly into seawater. For example, control system 720 can generate control signals for material dispensing system 730 to dispense an amount of calcium oxide into the seawater surrounding marine vessel 702 to be mixed with the turbulence and upwelling in the water according to a target chemical concentration level.

Material dispensing system 730 can include, for example, a dispensing subsystem that can expel substances from marine vessel 702. The dispensing subsystem can expel substances from marine vessel 702 through various openings in marine vessel 702 such as the ports 706, which are placed in various positions along marine vessel 702, or specialized openings in marine vessel 702. For example, material dispensing system 730 can independently dispense substances through each of the ports 706. Material dispensing system 730 can dispense substances through multiple ports 706 at the same time. The dispensing subsystem includes components configured to perform expulsion of particular amounts of substances with particular force at a particular rate. These substances can be mixed onboard marine vessel 702 or can be expelled to be mixed with seawater. For example, the dispensing subsystem can expel a calculated amount of calcium powder at a particular rate over a particular period of time with a calculated amount of force from a port 706 of marine vessel 702 to be mixed with the turbulence in the wake of marine vessel 702.

In one example, material dispensing system 730 can pump a mixture of seawater drawn into marine vessel 702 and calcium through the shaft of the marine vessel 702's propeller and release the substance through the blades of the propeller of marine vessel 702 such that the mixture is further mixed by the propeller. In another example, material dispensing system 730 can eject calcium oxide into the wake of marine vessel 702 with a calculated force.

Figure 7B:
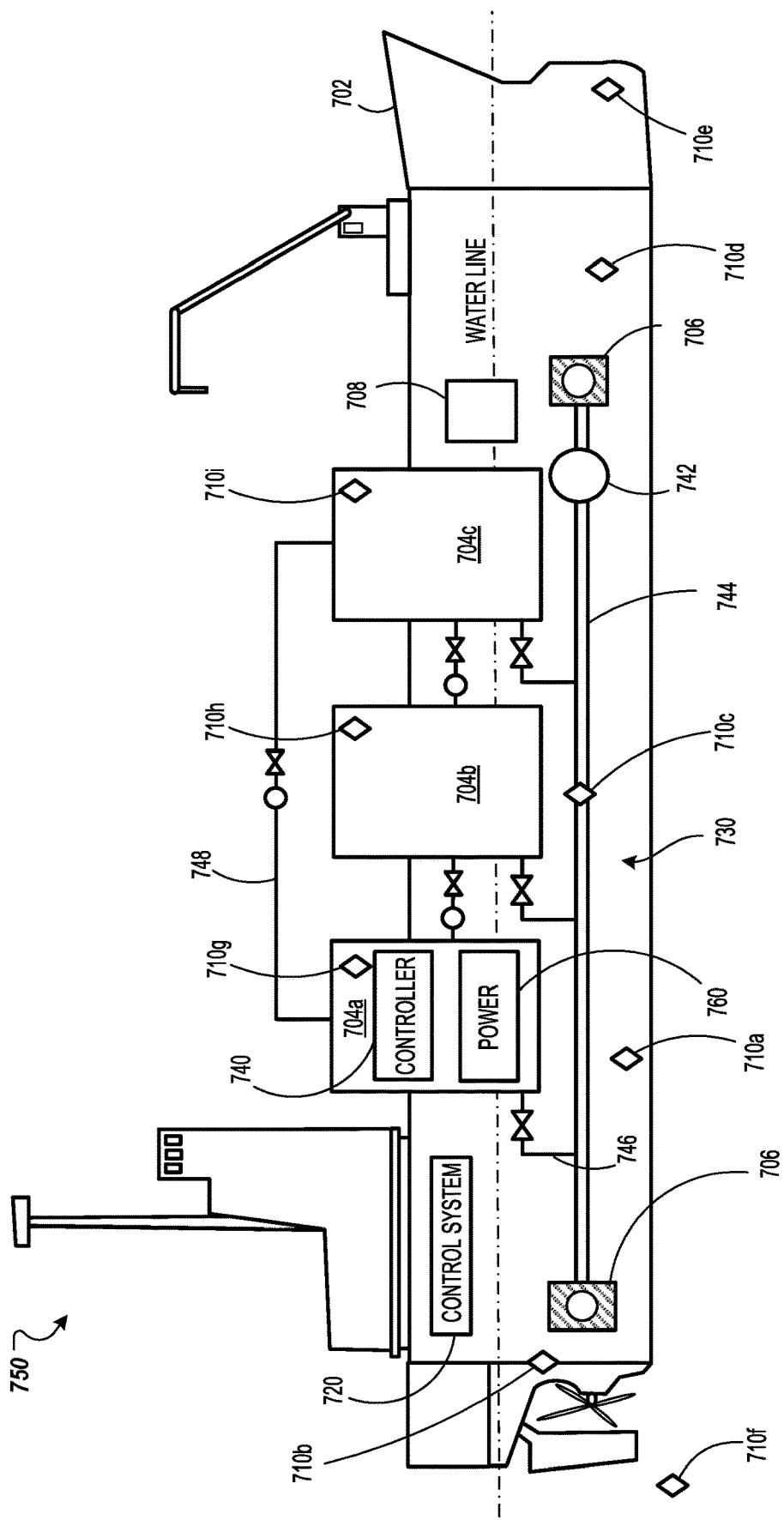

FIG. 7B is a diagram of an example configuration of control system for ocean chemistry modification 750. System 750 is similar to system 700 as described with respect to FIG. 7A, and includes additional elements. System 750 additionally includes container controller 740, and power system 760.

Cargo containers 704 are fitted with a protective bladder layer that protects the containers from corrosive effects of the calcium-containing material stored in the container. The calcium-containing material generally needs to be stored as a slurry (mixture of seawater and calcium-containing material) or in a pure powder form.

Figure 11B:
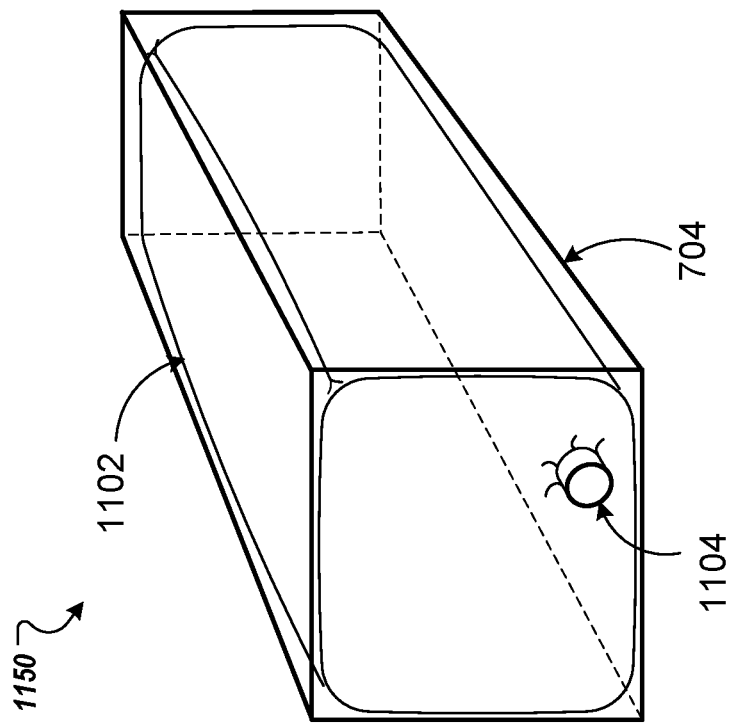
FIGS. 11A and 11B are different views of a standards-compliant shipping container outfitted with a protective bladder.
Figure 11A:
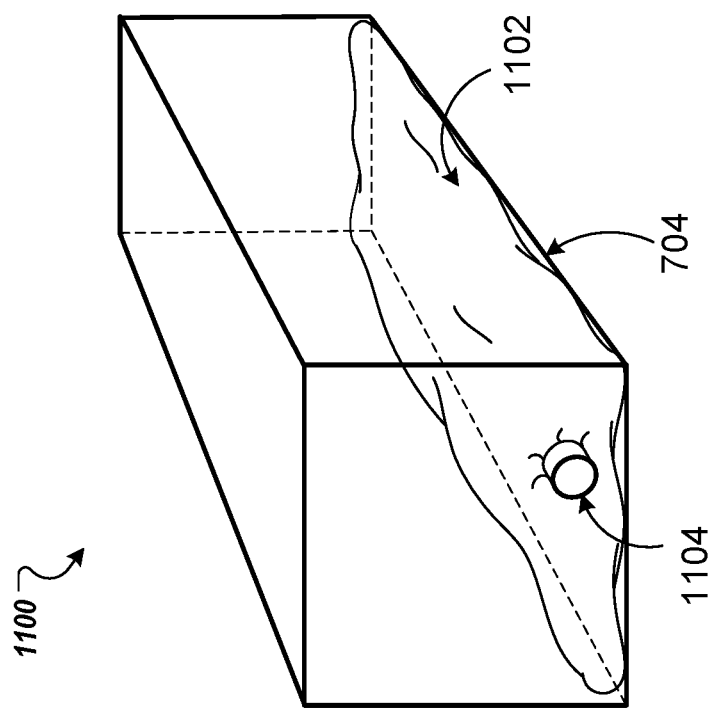

The protective bladder, described in further detail with respect to FIGS. 11A and 11B, is a flexible bladder that can be fit into standards-compliant cargo containers such that the containers are usable for shipping normal cargo and also for storing calcium-containing materials that can be used for ocean chemistry modification.

In some implementations, the calcium-containing material can be stored within portions of marine vessel 702 used for stability and ballasting. For example, marine vessel 702's ballast tanks can also be fitted with protective bladders and filled with a dry form of the calcium-containing material or a diluted slurry of the calcium-containing material.

The ballast is a component that provides stability to marine vessel 702, preventing marine vessel 702 from listing. The ballast weight generally remains below water level, and counteracts the effects of weight of marine vessel 702 above water level.

Marine vessel 702 is shown to include hatches or ports 706 to the outside of the marine vessel 702. These ports 706 allow for the expulsion of substances from within marine vessel 702 into the ocean and for the intake of substances from outside the marine vessel 702 into the marine vessel 702. The ports can be located at any point along marine vessel 702, such as the bow, along the hull, and the stern.

Marine vessel 702 can include a supply of materials to be dispersed into the ocean. For example, marine vessel 702 can house a supply of calcium-containing materials such as Ca or CaO or magnesium-containing materials such as Mg or MgO that can be released into seawater to increase seawater alkalinity. Calcium and/or calcium oxide can be stored in its solid state, for example, in powder or chunk form. Calcium and/or calcium oxide can be stored, for example, in a tank or other storage container. In some implementations, magnesium and/or magnesium oxide can be used in place of calcium and/or calcium oxide. In some implementations, the calcium-containing material can include $Ca(OH)_2$ or calcium hydroxide and the magnesium-containing materials include $Mg(OH)_2$ or magnesium oxide.

In order to achieve a particular concentration of chemical mixture to be released into the ocean, system 760 can control the mixing of the calcium-containing materials with water. Water can be obtained from, for example, the ocean. Marine vessel 702 can pump ocean water into system 760. By sourcing one of the reactants of the propulsion system from its current location, marine vessel 702 can reduce or eliminate fuel weight and allocate more weight to cargo. In some implementations, water can be obtained from the ocean through a high pressure outlet. In some implementations, water can be pumped into system 760. In some implementations, water can be stored in a tank or other storage container within marine vessel 702.

In some implementations, marine vessel 702 can include a backflow prevention system that prevents the backflow of water into the material to be dispersed. Because the reaction of materials such as calcium oxide and water is a source of energy, a backflow prevention system prevents wasted energy from unnecessary reactions. Additionally, a backflow prevention system acts as a safety measure against unexpected reactions occurring within a portion of system 760 that is not, for example, pressurized or designed to withstand the heat of reactions between water and materials such as calcium oxide.

In one example, sensor 710f is an array of sensors trailing marine vessel 702 that measures the ocean chemistry of the water in the wake of marine vessel 702. This trailing water chemistry data can be used, for example, as feedback to system 760 to adjust the control instructions generated by and/or provided to control system 720, material dispensing system 730, and container controller 740.

In one example, sensors 710g, 710h, and 710i are sensors placed within cargo containers 704. Sensors 710g, 710h, and 710i can each be an array of sensors that measure the conditions within a respective cargo container 704. For example, sensors 710g, 710h, and 710i can be sensors that measure the chemical concentration of the mixture of seawater and calcium-containing material within a respective cargo container 704. Seawater composition is variable, and sensors placed within cargo container 704 can be used to monitor the chemical composition of the contents of that container. This data can be used as feedback to control system 720, material dispensing system, and container controller 740. By monitoring the conditions within a particular cargo container 704, for example, system 760 can ensure that mixing is done according to a target chemical concentration and prevent undersaturation or oversaturation of the calcium-containing material to be mixed with seawater.

In some implementations, sensors 710 can include sensors that monitor environmental parameters such as approaching macrofauna such as whales, dolphins, and fish, among other forms of aquatic life. For example, sensors 710 can include a sonar array that provides data to system 760, where system 760 implements an immediate response to detection of an approaching whale. This response can include control instructions to alter the operation of material dispensing system 730 in addition to systems such as the navigation and propulsion systems of marine vessel 702.

Control system 720 includes one or more computer processors that control the operation of various components of system 760, including sensing system 108, material dispensing system 730, container controller 740, and components external to system 760, including systems that are integrated with or communicably connected to system 760, such as satellites, remote computing devices, and other marine vessels, among other systems.

In some implementations, container controller 740 is a part of, or integrated with, material dispensing system 730. For example, functions performed by container controller 740 can be described as functions of material dispensing system 730 generally. Container controller 740 can also be self-contained controller separate from material dispensing system 730.

Container controller 740 generates control signals to control and manage the contents of cargo containers 704 onboard marine vessel 702. For example, container controller 740 generates control signals for container-pump connections and container-container connections, collectively referred to as container control components. The one or more computer processors of container controller 740 continually and automatically determine control signals for cargo containers without communicating with a remote processing system. For example, container controller 740 can receive ocean chemistry feedback data from sensors 710 in response to actions taken by the container control components and process the data to determine and generate control signals for the container control components to alter or maintain a target level of chemical concentration, mass, or density, among other parameters, of substances within cargo containers 704.

Container controller 740 can control a mixing subsystem within cargo containers 704 that can mix precise proportions of water and calcium-containing material onboard marine vessel 702. The mixing subsystem can mix substances from different sources. For example, container controller 740's mixing subsystem can mix seawater drawn into marine vessel 702 through ports 706 with calcium oxide stored onboard marine vessel 702. The mixing subsystem includes components configured to perform mixing and pumping, among other actions. The mixing subsystem can draw substances from cargo containers 704, the water surrounding marine vessel 702, and other containers onboard marine vessel 702.

The mixing subsystem includes, for example, pump 742, piping 744, container-pump connections 746, and container-container connections 748.

Pump 742 is a pump that moves substances through, into, and out of marine vessel 702. Pump 742 can be an existing pump onboard marine vessel 702, such as a bilge pump, a fire main pump, or a circulating pump, among other types of pumps found onboard marine vessels. In some implementations, pump 742 can include a system of pumps. In some implementations, pump 742 is the main pump of the mixing subsystem and draws substances from cargo containers 704 to be ejected from marine vessel 702 by material dispensing system 730.

Piping 744 can be existing piping on marine vessel 702. Piping 744 can be rigid piping such as copper or other metal piping. In some implementations, piping 744 can be flexible piping such as flow lines or tubing. For example, piping 744 can be ship-based piping such as piping that is part of an existing seawater ballast system or a fire main system. Cargo containers 704 are connected to each other, to container controller 740, and to pump 742 via piping 744.

Container-pump connections 746 and container-container connections 748 are herein collectively referred to as the container control components 746 and 748.

Container-pump connections 746 are connections between a particular cargo container 704 and pump 742. Container-pump connections 746 include piping and a valve. In some implementations, container-pump connections 746 include a pump that can be considered part of pump 742 or can be separate from pump 742. Container-pump connections 746 connect cargo containers 704 to the main pipeline to pump 742. In some implementations, container-pump connections are a connection point between cargo containers 704 and material dispensing system 730.

Container-container connections 748 are connections between a particular cargo container 704 and another cargo container 704. Container-container connections 748 include piping and a valve. In some implementations, container-container connections 746 include a pump that can be considered part of pump 742 or can be separate from pump 742. Container-container connections 748 connect cargo containers 704 to each other and allow for container controller 740 and the mixing subsystem to move substances between cargo containers 704 in addition to mixing substances in and ejecting substances from cargo containers 704.

Whether and the order in which container controller 740 fills and empties cargo containers 704 with seawater and mixes calcium-containing material with the seawater can affect the stability of marine vessel 702 and its ballasting.

In some implementations, instead of mixing the substances onboard marine vessel 702, material dispensing system 730 can dispense a calculated portion of substances directly into seawater. For example, control system 720 can generate control signals for material dispensing system 730 to dispense an amount of calcium oxide into the seawater surrounding marine vessel 702 to be mixed with the turbulence and upwelling in the water according to a target chemical concentration level.

In some implementations, system 760 includes a single cargo container 704 designated for mixing that draws in seawater, titrates the calcium-containing material according to a target chemical parameter, and ejects the mixture. For example, container controller 740 can control the mixing of seawater and calcium-containing material to achieve a target pH within a single designated mixing cargo container 704 and eject the mixture from the single cargo container 704. This method allows other piping 744 in system 760 to have less stringent pH ratings, reducing the costs associated with implementing system 760.

In some implementations, container controller 740 controls other subsystems of marine vessel 702. For example, container controller 740 can control a ballasting system of marine vessel 702, where the ballast tank can be controlled in a manner similar to that of the cargo containers 704, and can be referred to as a container. For example, container controller 740 can maintain ship stability by moving mass from higher-elevation cargo containers 704 to lower-elevation cargo containers 704 prior to adding additional seawater. In some implementations, container controller 740 can control cargo containers 704 to provide a ballasting effect, circumventing the existing ballasting system.

Container controller 740 uses models including machine learning models and/or finite element models to simulate the mixing and shifting of substances within and between cargo containers 704, among other processes. Container controller 740 is configured to determine mixing instructions to create a slurry of calcium-containing material and seawater according to target parameters such as ocean chemistry levels, chemical concentrations, and ship stability and ballasting needs. For example, container controller 740 can automatically determine an optimal ratio of seawater to chemicals needed to produce a desired chemical concentration. Container controller 740 can automatically determine an optimal distribution of substances between cargo containers 704 according to a target ballast weight distribution.

Container controller 740 controls sensors 710 to collect and/or record data associated with the mixing and moving of substances within and between cargo containers 704 and chemical concentration of seawater surrounding marine vessel 702, among other measurable parameters. Sensors 710 can also measure movement and activity through optical, electrical, and magnetic techniques, among other detection techniques.

Container controller 740 is communicatively connected to sensing system 108, control system 720, and material dispensing system 730. In some implementations, control system 720 is connected to sensing system 108, control system 720, and material dispensing system 730 through communications buses with sealed conduits that protect against solid particles and liquid ingress. In some implementations, container controller 740 transmits control signals to components of system 760 wirelessly through various wireless communications methods, such as RF, sonic transmission, electromagnetic induction, etc.

Container controller 740 can receive feedback from sensing system 108. Container controller 740 can use the feedback from sensing system 108 to adjust subsequent control signals to system 760.

Container controller 740 can be communicatively connected to sensors other than sensors 710, such as sensors external to the system 760, and can use the data collected by sensors external to the system 760 in addition to the data collected by sensors 710 to generate control signals for the system 760. For example, container controller 740 can be communicatively connected to external weather monitoring systems, observation satellites, or GPS satellites that are external to the system 760. Control system 720 can also receive sets of data such as surveys of migration patterns of aquatic life and real-time data such as data collected by networks of buoys.

Container controller 740 allows for the modular implementation of system 760. Container controller 740 controls each cargo container 704 independently and can provide separate control signals to each cargo container 704 and its associated container control components 746, 748. For example, if a particular cargo container 704 is removed from system 760, container controller 740 can detect this removal and continue controlling system 760, accounting for the removal of the particular cargo container 704. In some implementations, container controller 740 can receive data indicating that a container has been removed, added, relocated, or otherwise changed, and container controller 740 can automatically determine what changes, if any, need to be implemented in the control of system 760.

Power system 760 is an onboard power system that provides power to the container controller 740. In some implementations, power system 760 also provides power to control system 720, mixing system 730, pump 742, and container control components 746 and 748. In some implementations, power system 760 can be integrated with, or can act as the main power system for marine vessel 702 to provide power for the navigation and propulsion systems.

Power system 760 can include generators. For example, power system 760 can use a heat sink engine, using cold ocean water driven to deeper depths for driving its heat exchange; ocean thermal energy conversion (OTEC); solar power; or other renewable energy systems, such as wind, nuclear, etc. In some implementations, power system 760 can use, among other types of fuel, the calcium-containing material to generate electric power.

As depicted in FIG. 7B, container controller 740 and power system 760 are housed within a particular cargo container 704a. In some implementations, container controller 740 and/or power system 760 can be separate from cargo container 704a.

Figure 8:
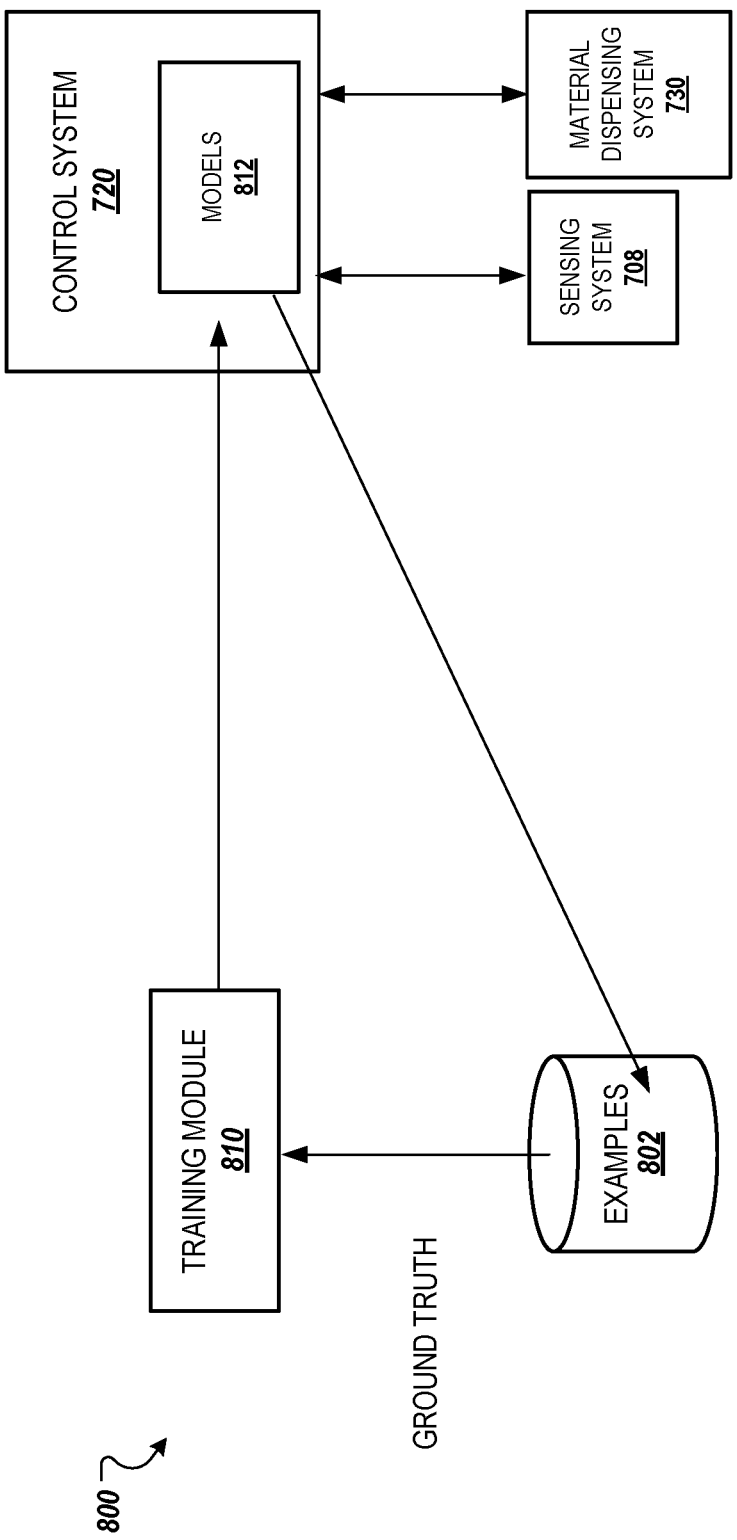
FIG. 8 is an example data flow for a control system for ocean chemistry modification.

FIG. 8 is an example data flow 800 for a control system for ocean chemistry modification. The process shown in data flow 800 can be performed locally or remotely. In some implementations, the process shown in data flow 800 is performed exclusively onboard marine vessel 702. In some implementations, the process shown in data flow 800 can be performed by a distributed computing system over a network connection such as the Internet. In some implementations, the process shown in data flow 800 is performed by control system 1020, as described below with respect to FIG. 10, exclusively onboard a single material dispensing module 1006. The process shown in data flow 800 can also be performed by control system 1020, implemented as a distributed computing system over a network connection such as the Internet.

Additionally, data flow 800 illustrates the process of forecasting ocean conditions such that the material dispensing system 1004 releases lime to maintain a pH level within some threshold amount of a target level in a particular geographical region. For example, data flow 800 can illustrate the process of forecasting ocean conditions to inform the control of material dispensing system 1004 to dispense calcium oxide to maintain an acidity level appropriate for calcifying organisms 1002, a coral reef. Data flow 800 allows a system to model how material that is released mixes and disperses over a region of interest, such as a seawater region surrounding or near calcifying organisms 1002.

As described above with respect to FIGS. 7A and 7B, system 700 includes a control system 720 that uses models to determine appropriate amounts of material to be mixed and/or released by material dispensing system 730. For example, control system 720 models water movement surrounding marine vessel 702 based on parameters detected by sensing system 708 and determines control signals for material dispensing system 730 or the modules.

Examples 802 are provided to training module 810 as input to train various models. Examples 802 can be positive examples (i.e., examples of correctly determined chemical concentration levels, upwelling patterns, turbulence, etc.) or negative examples (i.e., examples of incorrectly determined chemical concentration levels, upwelling patterns, turbulence, etc.).

Examples 802 include the ground truth, or a particular parameter defined, or confirmed, as the correct parameter. Examples 802 include sensor information such as baseline current patterns, turbulence flow, etc. For example, examples 802 can include chemical dispersion levels as detected by sensors 710 or sensors external to system 100 as described above.

The ground truth indicates the actual, correct parameter of a particular measurable factor. For example, a ground truth plume pattern can be generated and provided to training module 810 as an example 802 by modeling a plume and its movements and subsequently measuring the characteristics of the plume and its movements and confirming that the model was correct. In some implementations, a human can manually verify the outputs of the model. The correct parameter can be automatically detected and labelled by pulling data from a data storage medium that contains verified predicted parameters.

The ground truth parameters can be correlated with particular inputs of examples 802 such that the inputs are labelled with the ground truth parameters. With ground truth labels, training module 810 can use examples 802 and the labels to verify model outputs and continue to train the predictor to improve forward modelling of processes such as water motion and chemical dispersion through data collected by sensing system 708 to model the processes. For example, a ground truth plume pattern can be generated and provided to training module 810 as an example 802 by modeling a plume and its movements and subsequently measuring the characteristics of the plume and its movements and confirming that the model was correct. In some implementations, a human can manually verify the outputs of the model. The correct parameter can be automatically detected and labelled by pulling data from a data storage medium that contains verified predicted parameters.

The ground truth parameters can be correlated with particular inputs of examples 802 such that the inputs are labelled with the ground truth parameters. With ground truth labels, training module 810 can use examples 802 and the labels to verify model outputs and continue to train the predictor to improve forward modelling of processes such as water motion and chemical dispersion through data collected by sensing system 708 to model the processes.

Training module 810 trains models to perform process predictions. For example, training module 710 can train control system 720 to update and improve modelling of upwelling in the ocean. Training module 810 refines control system 720's models using data collected by sensing system 708. Training module 810 allows control system 720 to use complex modelling results, such as a predicted pattern of upwelling in addition to simple predictions such as patterns of turbulence in the wake of marine vessel 702 or due to movement of material dispensing modules. Models 812 can include various types of models, such as finite element models, neural networks, etc. Models 812 can be three-dimensional hydrodynamic models with variational parameterization. These models use dynamic parameterization to optimize and assess model accuracy. Models 812 can include various types of models, such as finite element models, neural networks, etc.

Inputs to models 812 can include water, weather, ship, and environmental parameters as described above with respect to FIGS. 1-7B. For example, models 812 can accept inputs such as wind conditions, weather conditions, cloud cover, current patterns, directions, and strength, tide patterns, ocean chemistry saturation, biological parameters of the calcifying organisms, material dispensing module parameters such as direction of travel and velocity, the sea state, seafloor topography, and sonar data. Inputs can include local data and data collected for more remote locations. Inputs can include actual release data measured by sensing system 708 from material dispensing modules, including the actual direction, rate, and amount of material released, among other parameters. Inputs can include data from fixed-position sensors of sensing system 708, data from sensors external to sensing system 708, such as ship or weather service sensors.

Training module 810 trains control system 720 using models 812 that can include objective functions. Models 812 can model various processes. For example, models 812 can model plumes of chemistry near marine vessel 702 or calcifying organisms and components of the material dispensing system. Control system 720 can use the outputs of these models to generate control signals for material dispensing system 730 to release appropriate amounts of a substance according to a preferred environmental threshold, such as a pH threshold.

Models 812 can model plumes of chemistry at timescales of hours, weeks, etc. Control system 720 can use these models 812 to determine appropriate amounts of material to be released by material dispensing system 730 according to a preferred environmental threshold such as a dispersion level. For example, with ocean currents perpendicular to marine vessel 702's direction of travel, a larger amount of a substance should be released to achieve a particular chemical concentration level because the substance will spread away from marine vessel 702's wake.

Models 812 can model upwelling and release chemistry. For example, models 812 can model the movements of fine rock particles that are ejected into upwelling areas. Models 812 can perform forward modelling to predict future process parameters and reverse modelling to determine process parameters needed to achieve a particular result. For example, models 812 can predict a force with which calcium particles must be ejected into a particular upwelling area to have a sufficient residence time near the surface to draw down atmospheric $CO_2$.

Models 812 can model weather patterns, biological patterns of relevant organisms such as calcifying organisms, and ocean movement patterns. Models 812 can perform forward modeling to project various outcomes of control signals to the material dispensing system and select an optimal set of navigation and/or material release parameters.

Models 812 can receive input data in real-time from various sensors. For example, models 812 can receive input data from sensing system 708 in real-time, in addition to input data from sources external to sensing system 708 or the material dispensing system. In some implementations, models 812 can receive input data at intervals. In some implementations, models 812 can be coupled to or receive input from external models. For example, models 812 can be coupled to weather forecast models from a scientific agency such as the National Oceanic and Atmospheric Administration.

Training module 810 can train control system 720 manually or the process could be automated.

Training module 810 uses the models 812 and examples 802 labelled with the ground truth parameters to train control system 720 to learn what is important for each model. Training module 810 allows control system 720 to learn by changing the weights applied to different variables to emphasize or deemphasize the importance of the variable within a model. By changing the weights applied to variables within a model, training module 810 allows the model to learn which types of information (e.g., which sensor inputs, etc.) should be more heavily weighted to produce a more accurate process prediction.

The examples and variables can be weighted based on, for example, feedback from control system 720, sensing system 708, and material dispensing system 730. Training module 810 uses, for example, reinforcement learning to optimize the outputs of models 812.

Training module 810 uses machine learning techniques to train control system 720, and can include, for example, a neural network that utilizes an objective function to produce parameters used in a water motion prediction model. These parameters can be prediction parameters that define particular values of a model used by control system 720. The objective functions can include, for example, a set of target health parameters of calcifying organisms as a whole.

The training module 810 optimizes chemical concentration stabilization across a local region of interest. For example, the training module 810 can optimize control signals for material dispensing system for a local region surrounding calcifying organisms. In some implementations, the training module 810 can also optimize performance globally across two or more control systems focused on different regions surrounding different sets of calcifying organisms.

Control system 720 uses the outputs of models 812 to perform various adjustments to the control of material dispensing system 730. Outputs of control system 720 include, for example, the amount of seawater needed to be drawn onboard marine vessel 702 to be mixed with a substance according to a target chemical concentration; the amount of a mixture or pure substance to be released; the rate at which the mixture or substance is released; and a period of time over which the mixture or substance is released according to the target chemical concentration. Control system 720 can also determine the force with which a particular mixture or substance should be ejected from marine vessel 702 according to a target mixing parameter. In some implementations, control system 720 can control the operation of other systems of marine vessel 702, including the navigation and propulsion systems. For example, control system 720 can use models 812 to adjust chemical dosing parameters for material dispensing system 730 based on ship parameters. Control system 720 can use models 812 to predict, control, and optimize dilution near the ship and overall ocean chemistry through control signals to material dispensing system 730. In some examples, control system 720 can use models 812 to optimize the movement or stabilization of material dispensing modules, such as material dispensing modules 1006. For example, the material dispensing modules can be controlled to compensate for tidal movement, bidirectional currents, extreme weather, and passing marine vessels and macrofauna, among other events. Control system 720 can use models 812 to predict, control, and optimize pathways for the material dispensing modules to maintain local ocean chemistry through control signals to the navigation systems of the modules.

Control system 720 can use the output of models 812 to enforce the geographically restricted release of chemicals. For example, control system 720 can implement a geofencing system by using geographical data collected by sensing system 708 to determine a physical perimeter for a protected or restricted area and restrict the release of the chemicals through material dispensing system 730 based on the perimeter. For example, control system 720 can refrain from releasing chemicals in areas such as port, protected marine areas, and areas too close to shore. In one example, control system 720 can determine, based on the output of models 812, that any released materials are likely to disperse into a restricted area even if the materials are not released in the restricted area, and can refrain from releasing the materials through material dispensing system 730. For example, based on a plume model on the order of days, control system 720 can determine that any calcium released may reach a protected coral reef and can refrain from providing control signals to material dispensing system 730 to release the calcium. In some implementations, control system 720 can control systems of marine vessel 702 to control the dispersion of substances released. For example, control system 720 can control the propulsion system of marine vessel 702 to increase turbulence in a particular direction.

In some implementations, control system 720 can control the release of materials through material dispensing system 730 to the benefit of the marine vessel 702 itself. For example, if ports 106 are located along the hull of marine vessel 702 or at the bow, chemicals can be released through ports 106c and flow along the hull of marine vessel 702 to inhibit growth of marine life such as barnacles or hull fouling.

In some implementations, control system 720 can use models 812 to model boundary layers along marine vessel 702 and its path of travel and release substances through material dispensing system 730 according to the model outputs such that the substances adhere to the hull before dispersing. In some implementations, control system 720 can control the release of substances through material dispensing system 730 according to the model outputs to reduce drag as marine vessel 702 travels through the ocean.

In some implementations, control system 720 can use models 812 to model the acoustics of marine vessel 702. For example, control system 720 can release substances through material dispensing system 730 according to acoustic model parameters to mask the acoustics of marine vessel 702.

Figure 9:
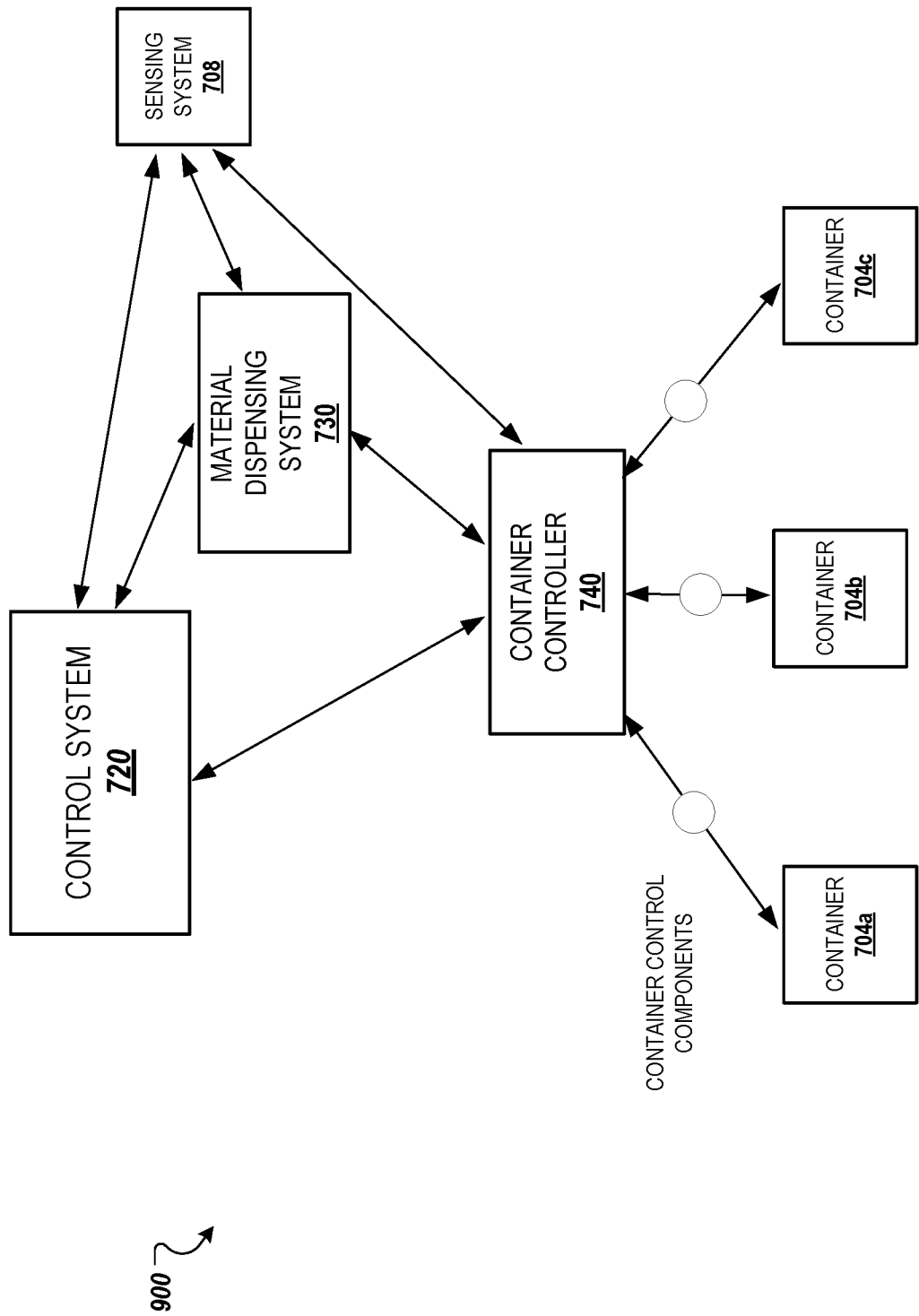
FIG. 9 is an example data flow for an active modular container system.

FIG. 9 is an example data flow for an active modular container system. The process shown in data flow 900 can be performed locally or remotely. In some implementations, the process shown in data flow 900 is performed exclusively onboard marine vessel 702. In some implementations, the process shown in data flow 900 can be performed by a distributed computing system over a network connection such as the Internet.

As described above with respect to FIG. 7B, system 760 includes a control system 720 that generates control signals indicating a target chemical concentration to be mixed and/or released by material dispensing system 730 and container controller 740. Control system 720 provides control signals to and receives feedback from material dispensing system 730 and container controller 740. Control system 720 and material dispensing system 730 can provide control signals to and receive measured data from sensing system 708. For example, the measured data from sensing system 708 can be used as input to models used by control system 720 and as feedback to material dispensing system 730.

Container controller 740 allows for system 700 to be modular, and can be compatible with various existing systems of marine vessel 702. As described above with respect to FIG. 7B, in some implementations, container controller 740 can be a component of or integral to material dispensing system 730. In some implementations, container controller 740 can be separate from material dispensing system 730. Container controller 740 can receive control signals from and provide feedback to material dispensing system 730. Container controller 740 can provide control signals to and receive measured data from sensing system 708.

Container controller 740 uses models to simulate the mixing of substances onboard marine vessel 702 for release from marine vessel 702 according to a target chemical concentration. Container controller 740 can also use models to simulate the movement of substances onboard marine vessel 702 according to a target ship stability parameter.

Container controller 740 uses various types of models, such as finite element models, neural networks, among other types. Inputs to the models can include water, weather, ship, chemical, and environmental parameters. For example, the models can receive measured values of a current chemical concentration within a particular cargo container 704, the amount of calcium-containing material mixed into a particular cargo container 704, the chemical properties of seawater drawn into a particular cargo container 704, among other parameters.

Container controller 740 uses the outputs of these models to perform various adjustments to the control of its mixing subsystem. Outputs of container controller 740 include, for example, the amount of seawater needed to be drawn onboard marine vessel 702 to be mixed with a substance according to a target chemical concentration; the amount of a calcium-containing material needed to be mixed into a particular amount of seawater according to a target chemical concentration; an amount of seawater and/or calcium-containing material needed to be shifted to a particular cargo and container or location onboard marine vessel 702 for the purposes of ship stabilization. In some implementations, container controller 740 can control the operation of other systems of marine vessel 702, including the navigation and propulsion systems.

Container controller 740 uses measured data from sensing system 708 to monitor the movement and mixing of substances within cargo containers 704. This data provides feedback to container controller 740 that can be fed into its models to perform adjustments to the control of its mixing subsystem. Container controller 740 can monitor and implement a feedback loop onboard marine vessel 702, where container controller 740 can locally update its models and control instructions to its mixing subsystem. In some implementations, container controller 740 can update a global model located remotely from system 700 that governs the operation of control system 720, material dispensing system 730, and/or container controller 740.

Container controller 740 can provide control signals to all and each of cargo containers 704. Container controller 740 can, for example, control its mixing subsystem to create a slurry of seawater and calcium-containing material according to a target chemical concentration. Container controller 740 controls the mixing subsystem, for example, by controlling the container control components 746, 748 to allow the opening and closing of connections between the cargo containers and any opening between marine vessel 702 and the surrounding seawater. Container controller 740 can control these connections by controlling valves of the container-pump connections 746 or container-container connections 748. Container controller 740 can control the movement of substances into and out of cargo containers 704 through the control of pump 742.

Figure 10:
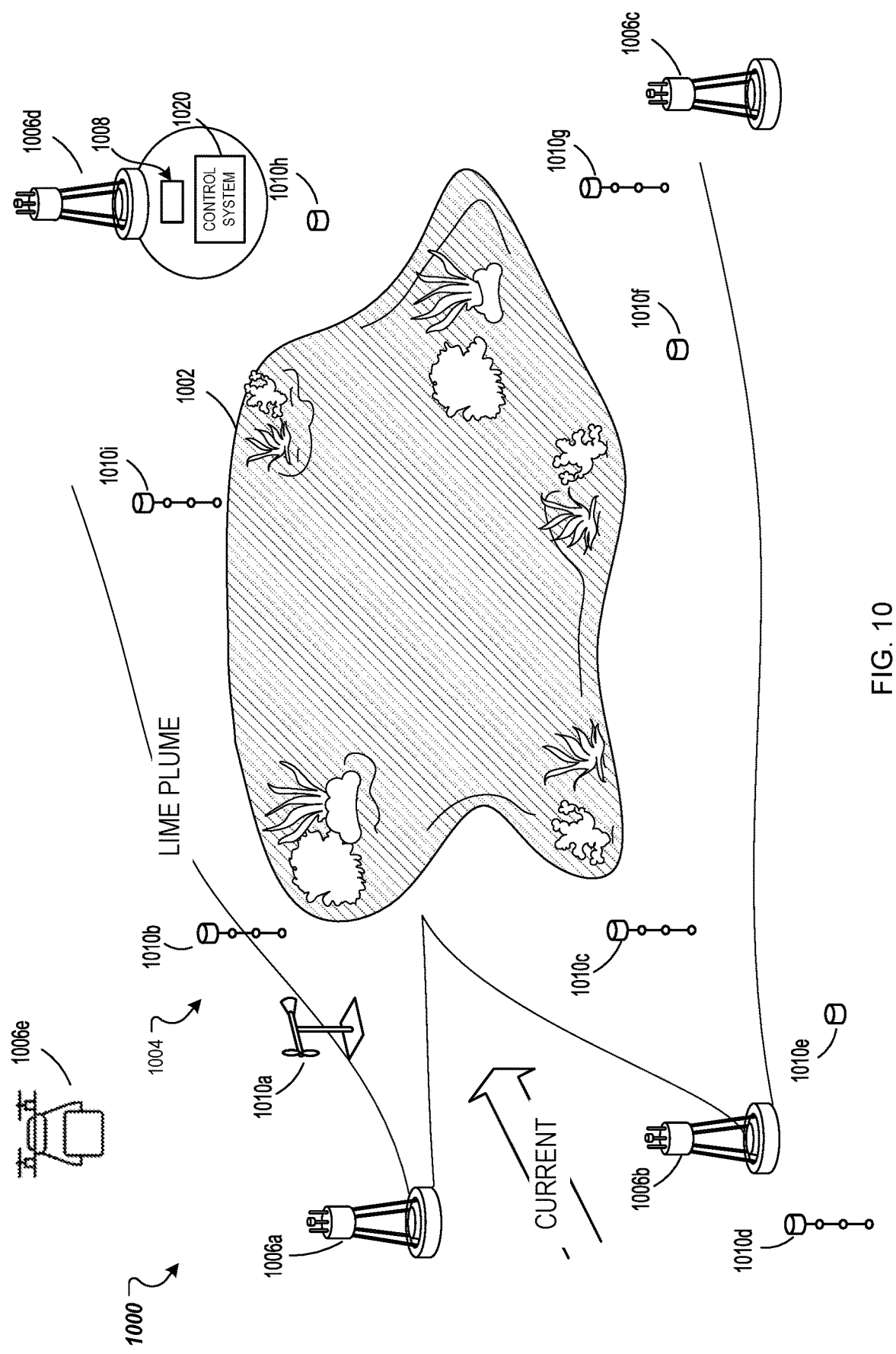
FIG. 10 is a diagram of an example configuration of a control system for ocean acidification prevention.

FIG. 10 is a diagram of an example configuration 1000 of a control system for ocean acidification prevention. Configuration 1000 is an example of a system that determines appropriate levels of materials and/or chemicals to be dispensed into the ocean and controls the dispensation of such materials and/or chemicals according to a target level of chemical concentration and other parameters to control the pH level of a local area of the ocean. The system includes calcifying organisms 1002, material dispensing system 1004, sensing system 1008, and control system 1020.

Marine calcifying organisms 1002 are organisms that form calcium carbonate to create protective exoskeletons. Calcifying organisms 1002 can also bond together to form ecosystems, such as reefs, that provide diverse species with a home. Ocean acidification presents a danger to calcifying organisms in two ways: a decrease in available carbonates (such as carbonate and bicarbonate ions) needed by the organisms to create exoskeletons and an increase in acidity that harms organisms sensitive to acidity and erodes existing exoskeletons. Calcifying organisms include, for example, mollusks, crustaceans, echinoderms, among other types of organisms.

Calcifying organisms 1002 are shown to cover a specific geographical area within the ocean. For example, calcifying organisms 1002 can include a congregation of calcifying organisms, such as a reef. In some implementations, calcifying organisms 1002 can be a gathering of calcifying organisms such as a shellfish farm or a nursery.

Material dispensing system 1004 includes one or more independently controlled material dispensing modules. In example configuration 1000, material dispensing system 1004 includes material dispensing modules 1006a, 1006b, 1006c, and 1006d (collectively referred to as material dispensing modules 1006). Each of material dispensing modules 1006 can be controlled independently and simultaneously. In some implementations, two or more material dispensing modules 1006 can be controlled as a unit. For example, two or more material dispensing modules 1006 can be provided with the same control signals.

In example configuration 1000, material dispensing modules of material dispensing system 1004 are shown to include material dispensing buoys 1006a, 1006b, and 1006c, and material dispensing drone 1006d. The material dispensing modules can be implemented as mobile, self-propelled buoys, ships, submarine devices, aircraft, and land-based pipelines among other forms.

Material dispensing modules 1006 can be anchored or moored in place. In some implementations, material dispensing modules 1006 can be mobile and can be positioned to optimize dispersion patterns of material from each module.

Each of material dispensing modules 1006 can include a supply of materials to be dispersed into the ocean. For example, the material dispensing modules 1006 can house a supply of alkali compounds such as calcium-containing materials or magnesium-containing materials that can be released into seawater to decrease ocean acidity. The calcium-containing material can include, for example, $CaO_2$ or calcium oxide and the magnesium-containing materials include $MgO_2$ or magnesium oxide. In some implementations, the materials can be any suitable alkali material that can mitigate ocean acidification within a geographical area. The amount of material stored within material dispensing modules 1006 can be varied based on parameters such as the needs of calcifying organisms 1002 and the water and weather conditions of the seawater surrounding and near calcifying organisms 1002.

Material dispensing modules 1006 include power systems. Each power system can be an onboard power system that provides power to the particular material dispensing module 1006. In some implementations, the power system can provide power to each material dispensing module 1006 of the material dispensing modules 1006. In some implementations, the power system also provides power to control system 1020 and the mixing system, among other systems. In some implementations, the power system can be integrated with, or can act as the main power system for, marine vessels that are part of material dispensing system 1004 to provide power for navigation and propulsion systems.

The power system can include generators. For example, the power system can use a heat sink engine, using cold ocean water driven to deeper depths for driving its heat exchange; ocean thermal energy conversion (OTEC); solar power; or other renewable energy systems, such as wind, nuclear, etc. In some implementations, the power system can use, among other types of fuel, the calcium-containing material to generate electric power for the entire system or for individual subsystems such as material dispensing system 1004.

In order to achieve a particular concentration of chemical mixture to be released into the ocean, material dispensing system 1004 can mix the calcium-containing materials into the surrounding seawater. Details of material dispensing system 1004's mixing and dispensing mechanisms are provided below.

In some implementations, material dispensing system 1004 dilutes materials before they are released into seawater to achieve a particular concentration. Material dispensing system 1004 can control the mixing of the alkali materials with water. For example, material dispensing modules 1006 can interface with a mixing system that draws in seawater from the ocean surrounding the modules. Each of the material dispensing modules 1006 can, for example, pump seawater into a mixing chamber within the module itself. By sourcing one of the reactants of the propulsion system from its current location, material dispensing modules 1006 increase their capacity for materials to be released into seawater. In some implementations, water can be obtained from the ocean through a high pressure outlet. In some implementations, water can be pumped into each of the material dispensing modules 1006. In some implementations, water can be stored in a tank or other storage container within or accessible to each material dispensing module 1006.

Sensing system 1008 is configured to monitor water, weather, and material dispensing parameters, among other measurable parameters. Sensing system 1008 includes sensors 1010a, 1010b, 1010c, 1010d, 1010e, 1010f, 1010g, 1010h, and 1010i (collectively referred to as sensors 1010). Each of sensors 1010 can be a single sensor of a particular type or an array of sensors. Sensors 1010 can be placed in various positions on and around material dispensing system 1004 or calcifying organisms 1002. For example, sensor 1010a can be an array of water quality parameter sensors placed on material dispensing buoy 1006b. Sensors 1010 can be placed along the path of expected flow between material dispensing system 1004 and calcifying organisms 1002 and on or near the independently controlled modules of material dispensing system 1004 or calcifying organisms 1002, among other locations. Sensors 1010 can be stationary or mobile. For example, sensors 1010 can be placed on drones, on boats, or set adrift in seawater.

Sensors 1010 detect, for example, water parameters, weather parameters, and material dispensing parameters. Water parameters include current data, water temperatures, pH levels, saturation levels of various chemicals, and O2 levels, levels of dissolved gases and/or compounds, levels of particulate matter, among other parameters associated with the local, geographical region in which calcifying organisms 1002 are located and other geographical regions. Weather parameters include wind speed and direction, wave data, tide data, solar radiation data, circulation patterns, cloud cover, solar radiation levels, and the weather forecast, among other parameters associated with the weather and environmental conditions. Material dispensing parameters include absolute velocity and water velocity of modules of material dispensing system 1004, direction of travel, propulsion mechanism speed, and rate of expulsion of material, among other parameters associated with material dispensing system 1004.

Sensors 1010 can also detect environmental factors such as seafloor topography and perform remote sensing of target areas. For example, sensors 1010 can monitor the pH levels of the area surrounding calcifying organisms 1002, for example, a reef, to protect the particular chemical concentration levels required in that area. Data from sensing system 1008 can be analyzed to generate data such as mass spectrometry of various materials.

Detection can be done using electrical, optical, and/or magnetic techniques by sensors such as accelerometers, gyroscopes, magnetometers, inertial measurement units (IMUs), GPS, visual sensors, depth sensors, chemical sensors, turbidity sensors, and/or encoders, among other types of detection techniques. Sensors 1010 can include velocity sensors, temperature sensors, infrared sensors, sonar sensors, pH sensors, salinity sensors, and biological parameter sensors, among other types of sensors. For example, sensors 1010 can include wind sensors, current sensors, anemometers, acoustic doppler current profilers (ADCPs), alkaline pH sensors, bicarbonate level sensors, dissolved CO2 sensors, total CO2 sensors, and partial pressure sensors, among other types of sensors. Sensors 1010 can include biometric sensors, chlorophyll sensors, fluorescence sensors, acoustic sensors, visual sensors, and other sensors adapted to detect organisms. For example, sensors 1010 can include hydrophones and stereo cameras that detect and track marine life over time.

In one example, sensor 1010d is an array of sensors in the flow path of material dispensing system 1004 that measures the ocean chemistry of the water within the plume of material being expelled from material dispensing system 1004. This water chemistry data can be used, for example, as feedback to the system to adjust the control instructions provided to material dispensing system 1004.

In some implementations, sensors 1010 can include sensors that monitor environmental parameters such as approaching macrofauna such as whales, dolphins, and fish, among other forms of aquatic life. For example, sensors 1010 can include a sonar array that provides data to the system, where the system implements an immediate response to detection of an approaching whale. This response can include control instructions to alter the operation of material dispensing system 1004, such as controlling the material dispensing modules 1006 to move out of the path of the approaching whale or stopping expulsion of materials temporarily, among other response actions.

Control system 1020 includes one or more computer processors that control the operation of various components of the system depicted in example configuration 1000, including sensing system 1008 and material dispensing system 1004, and components external to the system, including systems that are integrated with or communicably connected to the system, such as satellites, remote computing devices, and marine vessels, among other systems. In example configuration 1000 of the system, control system 1020 is implemented as a single module. Control system 1020 can be implemented as a distributed computing system over a network connection such as the Internet.

In example configuration 1000 of the system, control system 1020 is depicted as being contained within one of the material dispensing modules 1006. In some implementations, a particular material dispensing module 1006 contains control system 1020 and is communicably connected with the other material dispensing modules 1006 and other components of material dispensing system 1004. The particular material dispensing module 1006 can then communicate control signals to other components of material dispensing system 1004. In some implementations, control system 1020 can communicate control signals directly to other components of material dispensing system 1004.

In other configurations, control system 1020 can be separate from the material dispensing modules 1006 and can be communicably connected to each component of the material dispensing system 1004.

In some implementations, each material dispensing module 1006 includes its own control system 1020 that can operate independently and/or receive control signals from another control system 1020, adding a layer of redundancy in case of failure at any one point in the system. For example, each material dispensing module 1006 can have its own control system 1020 that can also receive control signals from a site control system 1020 that is local to the target region surrounding or near calcifying organisms 1002.

In some implementations, control system 1020 generates control signals for the system locally. The one or more computer processors of control system 1020 continually and automatically determine control signals for the system without communicating with a remote processing system. For example, control system 1020 can receive ocean chemistry feedback data from sensors 1010 in response to actions taken by material dispensing system 1004 and process the data to determine and generate control signals for material dispensing system 1004 to alter or maintain a target level of ocean chemistry or an area into which material is dispensed. Control system 1020 generates control signals that control the movement of material dispensing modules 1006, the mixing of materials to be released by material dispensing system 1004, and the expulsion of materials by material dispensing system 1004. Control system 1020 can control each component of material dispensing system 1004 independently. In some implementations, control system 1020 can coordinate control signals to multiple components of control system 1020.

In some implementations, control system 1020 generates control signals for material dispensing systems remotely. For example, the one or more computer processors of control system 1020 can be implemented as a distributed computing system across a network and can continually and automatically determine control signals for the system by communicating with and/or through a remote processing system. In some implementations, control system 1020 can control more than one material dispensing system 1004. For example, control system 1020 can be located locally to one material dispensing system 1004 and remotely from another material dispensing system 1004 and control system can generate control signals for each of the material dispensing systems 1004. In some implementations, control system 1020 can be located remotely from each material dispensing system 1004.

Control system 1020 generates control signals for material dispensing system 1004. Control system 1020 uses models including machine learning models and/or finite element models to predict ocean flow, mixing, chemical dispersion, and plume patterns, among other processes. Control system 1020 is configured to determine mixing and output instructions for material dispersion system 1004 according to target parameters such as ocean chemistry levels and the modelled processes. For example, control system 1020 can determine when to release materials, what concentration of seawater to chemicals is needed to produce a desired ocean chemistry concentration within a specific region surrounding or near calcifying organisms 1002 or another defined region, and how to achieve that concentration.

Control system 1020 controls sensors 1010 to collect and/or record data associated with actions of the material dispensing system 1004, ocean chemistry, weather, and water conditions surrounding material dispensing modules 1006, among other measurable parameters. For example, sensors 1010 can collect and/or record data associated with upwelling in a particular geographic area. Sensors 1010 can also measure movement and activity through optical, electrical, and magnetic techniques, among other detection techniques.

Control system 1020 is communicatively connected to sensing system 1008 and material dispensing system 1004. In some implementations, control system 1020 is connected to sensing system 1008 and material dispensing system 1004 through communications buses with sealed conduits that protect against solid particles and liquid ingress. In some implementations, control system 1020 transmits control signals to components of the system wirelessly through various wireless communications methods, such as RF, sonic transmission, electromagnetic induction, etc.

Control system 1020 can receive feedback from sensing system 1008. Control system 1020 can use the feedback from sensing system 1008 to adjust subsequent control signals to the components of the system.

Control system 1020 can be communicatively connected to sensors other than sensors 1010, such as sensors external to the system, and can use the data collected by sensors external to the system in addition to the data collected by sensors 1010 to generate control signals for the system. For example, control system 1020 can be communicatively connected to external weather monitoring systems, observation satellites, or GPS satellites that are external to the system. Control system 1020 can also receive sets of data such as surveys of migration patterns of aquatic life and real-time data such as data collected by networks of buoys.

Control system 1020 uses the sensor data to generate control signals for material dispensing system 1004. For example, control system 1020 can determine that a particular area, such as an area surrounding calcifying organisms 1002, is protected and use GPS to enforce geofencing technology, preventing the release and/or propagation of materials into the particular area. Control system 1020 can, for example, receive a predetermined set of protected areas. Control system 1020 can detect that a particular area should be protected or restricted. For example, if control system 1020 determines, based on data from sensing system 1008, that there is a gathering of calcifying organisms, control system 1020 can automatically designate an area as protected or restricted.

Control system 1020 generates control signals for navigation systems for the material dispensing modules 1006 that are mobile and can be independently controlled. For example, control system 1020 can control the navigation system of a material dispensing module 1006 to control propellers or other forms of propulsion for steering the module. In example configuration 1000, material dispensing modules 1006 are propelled and steered by propellers. In other implementations, material dispensing modules 1006 can be propelled and steered using other systems. The navigation system can be communicatively coupled to the propellers. In some implementations, the navigation system is coupled to the propellers through communication buses within environmentally sealed conduits. In some implementations, the navigation system transmits control signals to the propellers wirelessly through various wireless communications methods, such as RF, sonic transmission, electromagnetic induction, etc.

In some implementations, the navigation system can receive feedback from the propellers. For example, the navigation system can receive the actual rotational velocity of a propeller. The navigation system can use the feedback from the propellers to adjust subsequent control signals to the propellers.

The navigation system can determine a path through the ocean for the material dispensing module 1006 and corresponding control signals for the propellers locally. In some implementations, the navigation system is communicatively coupled to sensing system 1008, and uses data collected by sensing system 1008 to navigate. In some implementations, the navigation system is coupled to sensing system 1008 through communication buses within environmentally sealed conduits. In some implementations, the navigation system receives sensor data from sensing system 1008 wirelessly through various wireless communications methods, such as RF, sonic transmission, electromagnetic induction, etc.

In some implementations, the navigation system communicates with control system 1020 to receive new bearings. For example, sensing system 1008 can transmit position data of a material dispensing module 1006 to control system 1020, which processes the data and transmits a new bearing to the navigation system. The navigation system can receive the new bearing, process the data, and generate updated control signals for the propellers. In some implementations, the navigation system communicates with control system 1020 to receive new control signals for the propellers.

In some implementations, the navigation system can generate updated control signals for the propellers locally, without communicating with a remote server. For example, the navigation system can receive data from sensing system 1008, process the data to determine a new bearing, and generate updated control signals for the propellers. In some implementations, the navigation system can navigate material dispensing modules 1006 without the use of GPS. For example, the navigation system can navigate material dispensing modules 1006 using ocean positioning data collected by sensing system 1008.

Sensing system 1008 can transmit the data it collects to the navigation system. For example, sensing system 1008 can include a temperature sensor that detects and records the temperature of the water. Sensing system 1008 can include sensor arrays and transducers for receiving and transmitting underwater signals for positioning in the ocean and/or communicating between material dispensing modules 1006 and/or with a separate sea vessel, such as a maintenance boat. For example, sensing system 1008 can include sonar sensor arrays that detect the position of a particular material dispensing module 1006 in the ocean.

Sensing system 1008 can include vision sensors, such as sonar, cameras, etc. that detect objects or acquire images for image analysis by sensing system 1008 or control system 1020.

In some implementations, sensing system 1008 can detect objects near a material dispensing module 1006. For example, sensing system 1008 can use a sonar sensor array to detect objects on the ocean floor. In some implementations, sensing system 1008 can detect currents near a material dispensing module 1006. For example, sensing system 1008 can use water temperature and pressure data to determine the boundaries of a current.

The navigation system can use the data collected by sensing system 1008 to maintain optimal placement of material dispensing modules 1006 relative to calcifying organisms 1002. The navigation system can detect and predict conditions such as tidal, wind, or ocean currents. For example, the navigation system can receive data from sensing system 1008 indicating that the material dispensing module 1006 is currently caught in a fast-moving current and the material being released is dispersing in an unexpected pattern, but that the boundary between the current and calm water is 5 m below the center of the material dispensing module 1006's current position. In this example, the navigation system can generate control signals for the propellers 1006 to sink the structure 1000 below the boundary of the fast-moving current. The navigation system can steer material dispensing modules 1006 into or out of currents, based on a desired chemical concentration level and/or a desired geographical region, among other factors.

The navigation system can control the propellers to keep material dispensing modules 1006 geostationary. For example, in a storm, or other situations in which navigating conditions are suboptimal, the navigation system can receive feedback form the propellers and sensing system 1008 to maintain a position in which a module is to remain.

The navigation system can control the propellers to change a course of a material dispensing module 1006. For example, if the material dispensing module 1006 is called into a docking station for maintenance, the navigation system can receive the coordinates of the docking station and can generate control signals for the propellers to steer the module to the docking station.

The navigation system controls the propellers to steer a material dispensing module 1006 based on chemical concentrations of a region of seawater surrounding or near calcifying organisms 1002, current and other water conditions, the dispersion pattern of the material released from the material dispensing module 1006, and/or the condition of the calcifying organisms 1002, among other factors. The navigation system can steer the material dispensing module 1006 based on sensor data received from sensing system 1008 to maintain optimal water conditions and control the dispersion of the material into the desired region.

The above description of the navigation system of material dispensing system 1004 focuses on the navigation and control of marine material dispensing modules 1006. The navigation system or systems of material dispensing system 1004 can control material dispensing modules 1006 on land and in the air using similar techniques as described with respect to modules located in the ocean.

Material dispensing system 1004 is configured to dispense alkali materials into the surrounding water. Material dispensing system 1004 can include various subsystems configured for the mixing and expelling of materials from, for example, each of the material dispensing modules 1006. Subsystems of material dispensing system 1004 can be housed within the material dispensing modules 1006, placed in various positions along the area surrounding calcifying organisms 1002, and other regions. In some implementations, subsystems, such as a mixing subsystem, of material dispensing system 1004 can be housed separately from the material dispensing modules 1006. These subsystems can be communicably connected and accessible to the material dispensing modules 1006 and other components of the material dispensing system 1004 and control system 1020.

Material dispensing system 1004 can include a mixing subsystem that can mix precise proportions of water and alkali material onboard a material dispensing module 1006. For example, material dispensing module 1006*d* can include a mixing subsystem that mixes water with calcium oxide to produce a particular concentration for dispensing into seawater proximate to calcifying organisms 1002. The mixing subsystem can mix substances from different sources. For example, material dispensing system 1004's mixing subsystem can mix seawater drawn into a material dispensing module 1006 through ports with, for example, calcium oxide stored onboard the material dispensing module 1006. The mixing subsystem includes components configured to perform mixing and pumping, among other actions. Material dispensing system 1004's mixing subsystem can dispense a calculated portion of substances directly into seawater. For example, control system 1020 can generate control signals for material dispensing system 1004 to dispense an amount of calcium oxide into the seawater surrounding calcifying organisms 1002 to be mixed with the turbulence and upwelling in the water according to a target chemical concentration level.

Material dispensing system 1004 can include, for example, a dispensing subsystem that can expel substances from material dispensing modules 1006. The dispensing subsystem can expel substances from material dispensing modules 1006 through various openings in the modules such as ports placed in various positions along the modules. For example, each module can independently dispense substances through each port. Material dispensing modules 1006 can each dispense substances through multiple ports 1006 at the same time. The dispensing subsystem includes components configured to perform expulsion of particular amounts of substances with particular force at a particular rate. These substances can be mixed onboard material dispensing modules 1006 or can be expelled to be mixed with seawater. For example, the dispensing subsystem can expel a calculated amount of calcium oxide at a particular rate over a particular period of time with a calculated amount of force from a material dispensing module 1006 to be mixed with the tidal current surrounding calcifying organisms 1002.

In one example, the dispensing subsystem can include a jet that can spray a diluted mixture of alkali compounds in the air to increase dissolved $CO_2$ and balance ocean acidity more quickly than releasing calcium oxide directly into the seawater. In another example, material dispensing system 1004 can eject calcium oxide into seawater surrounding calcifying organisms 1002 in a particular direction, with a calculated force.

Material dispensing system 1004 can include mixing and dispensing systems that coordinate within a material dispensing module 1006. For example, a material dispensing module 1006 can include a pump and an impeller combination that draws water into the module through a pipe and injects a material compound stored in the material dispensing module 1006 into the water in the pipe. The turbulence generated by injecting the compound into the water mixes the material with the water to dilute the compound, and the material dispensing module 1006 can eject the resulting solution. Material dispensing modules 1006 can include, for example, a grate stirrer that generates turbulence to release solutions to further disperse into the local ocean region.

FIGS. 11A and 11B are different views of a standards-compliant shipping container outfitted with a protective bladder.

FIG. 11A is a view 1100 of a standards-compliant shipping cargo container outfitted with a protective bladder. Cargo container 704 is a cargo container as described above with respect to FIGS. 7A and 7B. Cargo container 704 can be a standards-compliant container used for shipping cargo internationally. For example, cargo container 704 can be ISO compliant.

Cargo container 704 contains a protective bladder 1102. In view 1100, protective bladder 1102 is in an empty state.

Protective bladder is a flexible bladder that fits within cargo containers 704. Protective bladder 1102 includes a protective material that resists the corrosive effects of calcium-containing material. The protective material selected for use in manufacturing protective bladder can depend on the particular substance to be stored in protective bladder 1102. In some implementations, protective bladder 1102 includes a layer of material that is protective over a flexible, water-tight material. In some implementations, protective bladder 1102 is manufactured entirely out of a protective material.

Protective bladder 1102 can be loaded onto the floor of cargo container 704 prior to cargo container 704 being loaded with cargo. For example, protective bladder 1102 can collapse such that cargo container 704 can be fully loaded with cargo.

Port 1104 is configured to allow the flow of material between the inside of cargo container 704 and the outside of cargo container 704. For example, port 1104 can be connected to the mixing system 730 through a network of piping 744 and the container control components 746 and 748. In some implementations, piping connections to cargo container 704 can be installed once and used throughout marine vessel 702's journey. In some implementations, the piping connections to cargo container 704 can be moved throughout marine vessel 702's journey.

Port 1104 is a connection that connects to the inside of protective bladder 1102 that allows substances to be pumped into and out of protective bladder 1102. Port 1104 provides a sealed connection point such that the substances contained within protective bladder 1102 do not leak out of protective bladder 1102 into cargo container 704 or into the hold of marine vessel 702 where cargo container 704 is located.

In one example, port 1104 can be mounted to a plate that replaces one door of cargo container 704. The standard door can be stowed onboard marine vessel 702 for the remainder of the journey. For example, the standard door can be stored inside of cargo container 704 along with protective bladder 1102.

In some implementations, cargo container 704 can include multiple ports 1104. For example, cargo container 704 can include a seawater inlet and a mixture outlet.

In some implementations, protective bladders 1102 are interconnected, eliminating or reducing the need for valves in the container-container connections 748.

As described above with respect to FIGS. 7A and 7B, sensor 110g is a sensor located within protective bladder 1102. Sensor 110g can be a sensor for measuring chemical concentrations, mixing, and other parameters within cargo container 704 as described above with respect to FIG. 1. In some implementations, sensor 110g can be placed at the outlet of protective bladder 1102.

FIG. 11B is another view 1150 of standards-compliant shipping container 704 outfitted with a protective bladder 1102. In view 1150, protective bladder 1102 is at least partially full of calcium-containing material and/or seawater.

Protective bladder 1102 is manufactured to fit within cargo container even when full of calcium-containing material and/or seawater.

In some implementations, cargo containers 704 can be half-height containers that allow full-volume loading within the mass limit.

Figure 12:
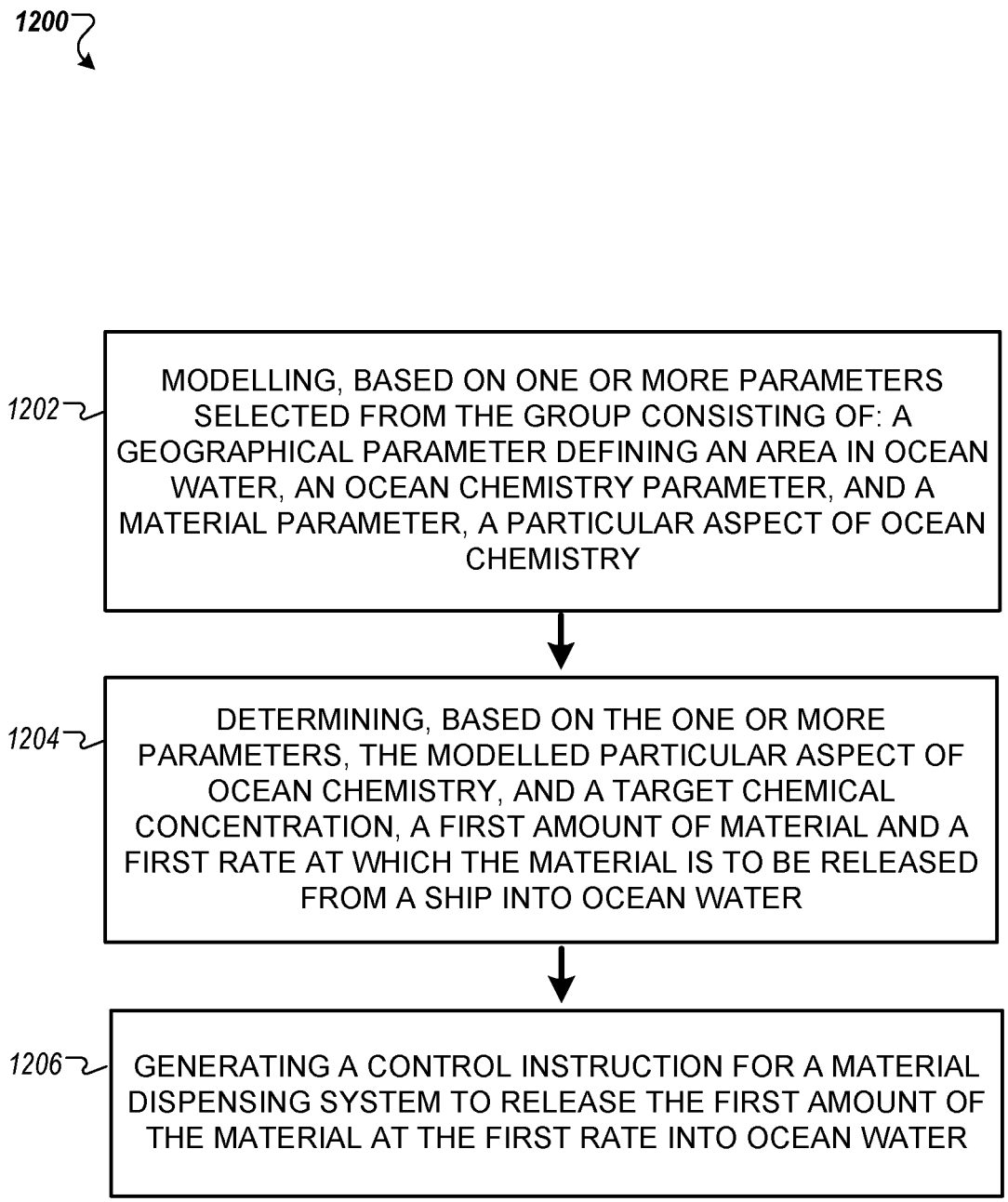
FIG. 12 is a flow chart of an example process of ocean chemistry modification.

FIG. 12 is a flow chart of an example process 1200 of ocean chemistry modification. Process 1200 can be implemented by control systems for ocean chemistry modification such as systems 700, 750, and 1000 as described above with respect to FIGS. 1-11. In this particular example, process 1200 is described with respect to systems 700, 750, and 1000. Briefly, according to an example, the process 1200 begins with step 1202 by modelling, based on one or more parameters selected from the group consisting of a geographical parameter defining an area in ocean water, an ocean chemistry parameter, and a material parameter, a particular aspect of ocean chemistry. For example, control system 720 can use the physical properties of calcium powder to model the pH level and dispersion of calcium in the seawater surrounding marine vessel 702 or calcifying organisms 1002.

Process 1200 continues with step 1204 by determining, based on the one or more parameters, the modelled particular aspect of ocean chemistry, and a target chemical concentration, a first amount of material and a first rate at which the material is to be released from a ship into ocean water. For example, control system 720 can determine, based on the physical properties of calcium powder, the pH level, and dispersion of the amount of calcium, and a target concentration level of calcium, an amount of calcium and the rate at which the calcium should be released from marine vessel 702 into the seawater surrounding marine vessel 702. In some implementations, step 1204 includes determining, based on the one or more parameters, the modelled material dispersion on the particular time scale, and a target chemical parameter, a first amount of material, a release time, and a first rate at which the material is to be released into ocean water. For example, control system 1020 can determine, based on the physical properties of calcium oxide, the pH level, dispersion of the amount of calcium oxide, and a target pH level of the particular region of water surrounding calcifying organisms, an amount of calcium oxide and the rate at which the calcium oxide should be released from a material dispensing module 1006 into the seawater surrounding calcifying organisms 1002. Control system 1020 also determines a release time at which the calcium oxide should be released at the determined rate.

Process 1200 continues with step 1206 by generating a control instruction for a material dispensing system to release the first amount of the material at the first rate into ocean water. For example, control system 720 can generate a control instruction for material dispensing system 730 to release the determined amount of calcium at the determined rate into the seawater surrounding marine vessel 702 or calcifying organisms 1002.

Figure 13:
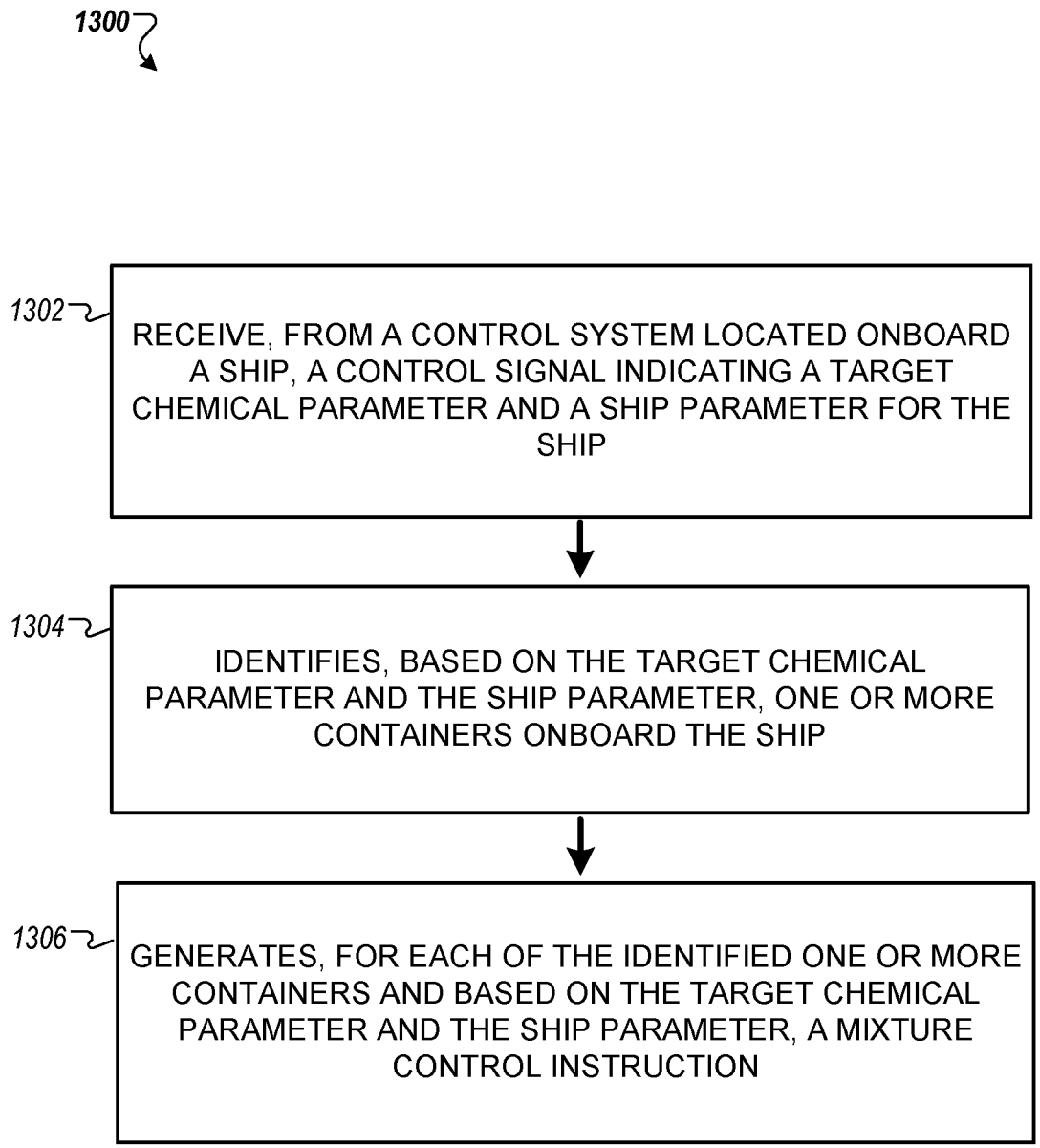
FIG. 13 is a flow chart of an example process for controlling the mixing and dispensing of calcium-containing material from a ship.

FIG. 13 is a flow chart of an example process 1300 for controlling the mixing and dispensing of calcium-containing material from a ship. Process 1300 can be implemented by 100, 700, 750, and 1000 as described above with respect to FIGS. 1-10. In this particular example, process 1300 is described with respect to system 750.

In one example, during marine vessel 702's voyage, control system 720 can provide control signals to material dispensing system 730 and container controller 740 to pump seawater into one or more of cargo containers 704 fitted with protective bladders 1102. Cargo containers 704 can contain calcium-containing material. Container controller 740 can provide control signals to pump 742 to pump seawater into marine vessel 702 through a port 706. In some implementations, protective bladders 1102 can be initially filled with a concentrated slurry of seawater and calcium-containing material and the slurry can be released along the journey instead of, or in addition to, mixing seawater into calcium-containing material to create a diluted slurry.

Control system 720 can determine a target chemical concentration to be achieved and provide control signals to container controller 730 to mix the seawater into the calcium-containing material for eventual discharge into the ocean. The mixing dilutes the calcium-containing material, which can be basic, to prevent the discharge of highly alkali material. In some implementations, the seawater is directly mixed into a particular cargo container 704 storing calcium-containing material. In some implementations, the seawater is drawn into an intermediary cargo container 704 solely for storing seawater and mixed with the calcium-containing material in a designated mixing container. In one example, the intermediary cargo container 704 can be an existing ballast tank onboard marine vessel 702. In some implementations, the seawater is drawn directly into a mixing cargo container 704 and the calcium-containing material is pumped into the mixing cargo container 704.

In some implementations, drawing the seawater onboard marine vessel 702 can affect the ballast of marine vessel 702. Container controller 740 can determine an appropriate amount of seawater to be drawn into marine vessel's 702 ballast to maintain required ballast mass and avoid listing.

Once container controller 740 determines that the mixing is completed according to a target chemical concentration, the mixture can be pumped out of cargo container 704 and ejected into the seawater surrounding marine vessel 702 by material dispensing system 730. In some implementations, the mixture can be dispensed directly out of cargo container 704 without flowing through piping 744. For example, cargo container 704 may have a port that allows the flow of substances directly to the outside of marine vessel 702.

In some implementations, container controller 740 can perform the mixing and dispensation sequentially. For example, one cargo container 704 storing the calcium-containing material can be filled with a measured amount of seawater and dispensed and then the next container can be filled and mixed with seawater and released, until the contents of each of cargo containers 704 storing the calcium-containing material are dispersed into the ocean.

Once marine vessel 702 reaches its destination port, protective bladders 1102 can be removed from cargo containers 704. For example, protective bladders 1102 can be removed from cargo containers 704 and then the bladders can be loaded into a single container for shipping back to the origin. In some implementations, cargo containers 704 having protective bladders 1102 are removed from the ship and then the protective bladders are removed and stored for shipment back to the origin.

Briefly, according to an example, the container control process 1300 begins with step 1302 in which a container controller receives, from a control system located onboard a ship, a control signal indicating a target chemical parameter and a ship parameter for the ship. For example, container controller 740 can receive a control instruction from control system 720 onboard marine vessel 702 indicating a target chemical concentration and a required ballast mass for marine vessel 702.

Process 1300 continues with step 1304 in which the container controller identifies, based on the target chemical parameter and the ship parameter, one or more containers onboard the ship. For example, container controller 740 can identify, based on the control signal from control system 720, one or more particular cargo containers 704 onboard marine vessel 702. Container controller 740 can identify the particular cargo container 704 based on information regarding the amount of calcium-containing material stored in each cargo container 704 and information regarding the ship stability requirements of marine vessel 702.

Process 1300 continues with step 1306 in which the container controller generates, for each of the identified one or more containers and based on the target chemical parameter and the ship parameter, a mixture control instruction. For example, container controller 740 can generate, for each of the one or more cargo containers 704, a control instruction for the container control components 746, 748 to perform mixing of seawater and according to the target chemical concentration and required ballast mass. Container controller 740 can, for example, monitor the mixing process through sensing system 708. Sensing system 708 can provide feedback to container controller 740 to adjust the mixing process and control signals to its mixing subsystem.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method, comprising:
   receiving, at a carbon negative energy generation system, input comprising calcium oxide and water;
   reacting, within a reaction chamber of the carbon negative energy generation system, the calcium oxide and water to release energy and generate calcium hydroxide;
   directing, by the carbon negative energy generation system, the released energy to facilitate propulsion or onboard electricity generation; and dispensing, by the carbon negative energy generation system, the calcium hydroxide into the ocean to sequester atmospheric $CO_2$.

2. The method of claim 1, wherein the input further comprises at least one of:
calcium metal, magnesium oxide, and magnesium metal.

3. The method of claim 1, wherein the released energy directly provides power through an electrochemical mechanism in the form of electric energy.

4. The method of claim 1, wherein the released energy is thermal energy.

5. The method of claim 1, wherein directing the released energy to facilitate propulsion or onboard electricity generation comprises:
directing the released energy to a heat engine; and
directing the output of the heat engine to an electrical generator,
wherein the released energy is thermal energy.

6. The method of claim 1, wherein directing the released energy to facilitate propulsion or onboard electricity generation comprises directing the released energy to a turbine, and wherein the released energy is thermal energy.

7. The method of claim 1, wherein dispensing the calcium hydroxide into the ocean to sequester atmospheric $CO_2$ comprises:
controlling, by the carbon negative energy generation system and according to at least one of a target rate of release, a target volume of release, and a geographic location, the release of the calcium hydroxide.

8. A carbon negative energy generation system, comprising:
a boiler configured to react input comprising calcium oxide and water to release energy and generate calcium hydroxide and direct the released energy to facilitate propulsion or onboard electricity generation;
a thermal management system configured to heat material streams before the streams are input to the boiler; and
a dispersion system configured to dispose of the calcium hydroxide into the ocean to sequester atmospheric $CO_2$.

9. The system of claim 8, wherein the dispersion system comprises a material dispensing system comprising one or more independently controlled modules that each release material into ocean water.

10. The system of claim 8, wherein the input further comprises at least one of:
calcium metal, magnesium oxide, and magnesium metal.

11. The system of claim 8, further comprising:
a sensing system that detects one or more parameters selected from the group consisting of: a geographical parameter defining an area in ocean water, an ocean chemistry parameter, and a material parameter; and
a controller that controls the dispersion system according to a target chemical concentration by:
modelling, based on the one or more parameters, a particular aspect of ocean chemistry;
determining, based on the one or more parameters, the modelled particular aspect of ocean chemistry, and the target chemical concentration, a first amount of material and a first rate at which the material is to be released from the ship into ocean water; and
generating a control instruction for the dispersion system to release the first amount of the material at the first rate into ocean water.

12. The system of claim 8, wherein the released energy directly provides power through an electrochemical mechanism in the form of electric energy.

13. The system of claim 8, wherein the released energy is thermal energy.

14. The system of claim 8, wherein directing the released energy to facilitate propulsion or onboard electricity generation comprises:
directing the released energy to a heat engine; and
directing the output of the heat engine to an electrical generator,
wherein the released energy is thermal energy.

15. The system of claim 8, wherein directing the released energy to facilitate propulsion or onboard electricity generation comprises directing the released energy to a turbine, and wherein the released energy is thermal energy.

16. The system of claim 8, wherein dispensing the calcium hydroxide into the ocean to sequester atmospheric $CO_2$ comprises:
controlling, by the carbon negative energy generation system and according to at least one of a target rate of release, a target volume of release, and a geographic location, the release of the calcium hydroxide.

17. The system of claim 8, further comprising:
two or more shipping standard compliant containers connected by piping, wherein a first container of the two or more containers contains seawater and a second container of the two or more containers contains calcium oxide, each of the two or more containers having a protective bladder lining manufactured according to a target protection parameter based on the calcium oxide; and
a mixing system that is connected to each of the two or more containers by piping; and
a controller that controls the mixing system by providing control signals to the mixing system to control the mixing of calcium oxide and ocean water by controlling the connection between the second container and the first container.

18. A computer-readable storage device storing instructions that when executed by one or more processors cause the one or more processors to perform operations comprising:
receiving, at a carbon negative energy generation system, input comprising calcium oxide and water;
reacting, within a reaction chamber of the carbon negative energy generation system, the calcium oxide and water to release energy and generate calcium hydroxide;
directing, by the carbon negative energy generation system, the released energy to facilitate propulsion or onboard electricity generation; and
dispensing, by the carbon negative energy generation system, the calcium hydroxide into the ocean to sequester atmospheric $CO_2$.

19. The computer-readable storage device of claim 18, wherein the released energy directly provides power through an electrochemical mechanism in the form of electric energy.

20. The computer-readable storage device of claim 18, wherein dispensing the calcium hydroxide into the ocean to sequester atmospheric CO2 comprises:
controlling, by the carbon negative energy generation system and according to at least one of a target rate of release, a target volume of release, and a geographic location, the release of the calcium hydroxide.

* * * * *